(12) United States Patent
Chung et al.

(10) Patent No.: US 10,778,965 B2
(45) Date of Patent: Sep. 15, 2020

(54) STEREOSCOPIC DISPLAY DEVICE

(71) Applicant: LG Display Co., Ltd., Seoul (KR)

(72) Inventors: Bogyun Chung, Goyang-si (KR); JinWoo Park, Goyang-si (KR); DongHoon Lee, Goyang-si (KR); JinYeong Kim, Goyang-si (KR); HyungJu Park, Goyang-si (KR); Mira Yun, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 304 days.

(21) Appl. No.: 15/691,564

(22) Filed: Aug. 30, 2017

(65) Prior Publication Data

US 2018/0063520 A1 Mar. 1, 2018

(30) Foreign Application Priority Data

Aug. 31, 2016 (KR) .................. 10-2016-0112235
Dec. 28, 2016 (KR) .................. 10-2016-0180993

(51) Int. Cl.
| | | |
|---|---|---|
| *H04N 13/388* | (2018.01) | |
| *H04N 13/337* | (2018.01) | |
| *H04N 13/398* | (2018.01) | |
| *H04N 13/346* | (2018.01) | |

(52) U.S. Cl.
CPC ......... *H04N 13/388* (2018.05); *H04N 13/337* (2018.05); *H04N 13/346* (2018.05); *H04N 13/398* (2018.05); *H04N 2213/001* (2013.01)

(58) Field of Classification Search
None
See application file for complete search history.

(56) References Cited

U.S. PATENT DOCUMENTS

| | | | |
|---|---|---|---|
| 4,509,837 A | 4/1985 | Kassies | |
| 5,086,354 A | 2/1992 | Bass et al. | |
| 5,589,980 A * | 12/1996 | Bass | G02B 27/2292 |
| | | | 359/478 |
| 6,522,310 B1 * | 2/2003 | Kim | G09G 3/003 |
| | | | 345/6 |
| 6,525,699 B1 * | 2/2003 | Suyama | G02B 27/2278 |
| | | | 345/6 |
| 6,542,297 B1 * | 4/2003 | Lee | G02B 7/1824 |
| | | | 359/466 |
| 7,002,532 B2 * | 2/2006 | Suyama | G02B 27/2278 |
| | | | 345/6 |
| 7,401,923 B2 * | 7/2008 | Fergason | G02B 27/26 |
| | | | 353/20 |

(Continued)

FOREIGN PATENT DOCUMENTS

| | | |
|---|---|---|
| CN | 201364441 Y | 12/2009 |
| CN | 201518076 U | 6/2010 |

(Continued)

*Primary Examiner* — Dave Czekaj
*Assistant Examiner* — Shanika M Brumfield
(74) *Attorney, Agent, or Firm* — Seed IP Law Group LLP

(57) ABSTRACT

Disclosed is a stereoscopic display device for realizing a sharp and realistic stereoscopic image. The stereoscopic display device includes a first display displaying a first image, a second display displaying a second image, and a semi-transmissive optical member including a polarization transmissive axis transmitting the first image and a polarization reflective axis reflecting the second image.

30 Claims, 12 Drawing Sheets

(56) References Cited

U.S. PATENT DOCUMENTS

| | | | | |
|---|---|---|---|---|
| 7,411,636 B2* | 8/2008 | Abileah | | H04N 13/337 |
| | | | | 349/15 |
| 8,299,980 B2* | 10/2012 | Takahashi | | G02B 27/2292 |
| | | | | 345/4 |
| 8,994,786 B2* | 3/2015 | Tsang | | G03H 1/2294 |
| | | | | 348/40 |
| 10,037,746 B2* | 7/2018 | Priede | | G09G 3/003 |
| 10,300,389 B2* | 5/2019 | Ackley | | A63F 13/65 |
| 2002/0008908 A1* | 1/2002 | Yamamoto | | H04N 13/337 |
| | | | | 359/465 |
| 2002/0113868 A1* | 8/2002 | Park | | G02B 5/3016 |
| | | | | 348/51 |
| 2002/0126396 A1* | 9/2002 | Dolgoff | | G02B 27/2278 |
| | | | | 359/743 |
| 2006/0291051 A1* | 12/2006 | Kim | | H04N 13/302 |
| | | | | 359/462 |
| 2007/0159602 A1* | 7/2007 | Fergason | | G02B 27/26 |
| | | | | 353/8 |
| 2007/0285774 A1* | 12/2007 | Merrirt | | G02B 27/26 |
| | | | | 359/465 |
| 2009/0303597 A1* | 12/2009 | Miyawaki | | G02B 27/22 |
| | | | | 359/559 |
| 2011/0199547 A1* | 8/2011 | Hayashi | | G02B 27/26 |
| | | | | 349/15 |
| 2013/0076995 A1* | 3/2013 | Huang | | G02B 27/26 |
| | | | | 349/9 |
| 2014/0104682 A1* | 4/2014 | Nagahara | | G02B 27/22 |
| | | | | 359/463 |
| 2016/0050406 A1* | 2/2016 | Park | | G02B 27/2221 |
| | | | | 348/49 |
| 2018/0231832 A1* | 8/2018 | Liu | | G02B 26/08 |

FOREIGN PATENT DOCUMENTS

| | | |
|---|---|---|
| CN | 102750893 A | 10/2012 |
| CN | 103629594 A | 3/2014 |

* cited by examiner

STEREOSCOPIC DISPLAY DEVICE

CROSS-REFERENCE TO RELATED APPLICATIONS

This application claims the benefit of the Korean Patent Application Nos. 10-2016-0112235 filed on Aug. 31, 2016, and 10-2016-0180993 filed on Dec. 28, 2016 which are hereby incorporated by reference as if fully set forth herein.

BACKGROUND

Technical Field

The present disclosure relates to a stereoscopic display device.

Description of the Related Art

Recently, as requirements of users for a vivid and realistic image increase, stereoscopic display devices for displaying a stereoscopic (or three-dimensional (3D)) image based on the binocular disparity principle of a watcher are being developed.

FIG. 1 is a diagram schematically illustrating a related art stereoscopic display device. The related art stereoscopic display device includes a liquid crystal display (LCD) 1 and a transparent display 2 which are vertically (or laterally) disposed with a gap G therebetween. The related art stereoscopic display device displays a first image I1 on the LCD 1 and displays a second image I2 on the transparent display 2. Therefore, a watcher may watch a stereoscopic image based on the first and second images I1 and I2 having different depths equal to a distance of the gap G.

However, in the related art stereoscopic display device, since the first image I1 displayed on the LCD 1 passes through the transparent display 2 disposed in an upper portion (or a front portion), a luminance of the first image I1 is reduced, and for this reason, it is unable to realize a sharp and realistic stereoscopic image.

BRIEF SUMMARY

Briefly and in general terms, the present disclosure is directed to a stereoscopic display device that substantially obviates one or more technical problems due to limitations and disadvantages of the related art.

Some embodiments of the present disclosure are directed to providing a stereoscopic display device for realizing a sharp and realistic stereoscopic image.

Other embodiments of the present disclosure are directed to providing a stereoscopic display device which is slimmed.

Additional features of the disclosure will be set forth in part in the description which follows and in part will become apparent to those having ordinary skill in the art.

In accordance with the disclosure, as embodied and broadly described herein, there is provided a stereoscopic display device including a first display displaying a first image, a second display displaying a second image, and a semi-transmissive optical member including a polarization transmissive axis transmitting the first image and a polarization reflective axis reflecting the second image.

The semi-transmissive optical member may include a vertical portion parallel to the first display and an inclined portion inclined from the vertical portion to face the second display.

The stereoscopic display device may further include a third display disposed in parallel with the second display with the semi-transmissive optical member therebetween, the third display displaying a third image, and the semi-transmissive optical member may include a first inclined portion transmitting the first image and reflecting the second image and a second inclined portion transmitting the first image and reflecting the third image.

The stereoscopic display device may further include a third display disposed in parallel with the second display with the semi-transmissive optical member therebetween, the third display displaying a third image, and the semi-transmissive optical member may include a first inclined portion transmitting the first image and reflecting the second image, a second inclined portion transmitting the first image and reflecting the third image, and a vertical portion provided between the first inclined portion and the second inclined portion in parallel with the first display to transmit the first image.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
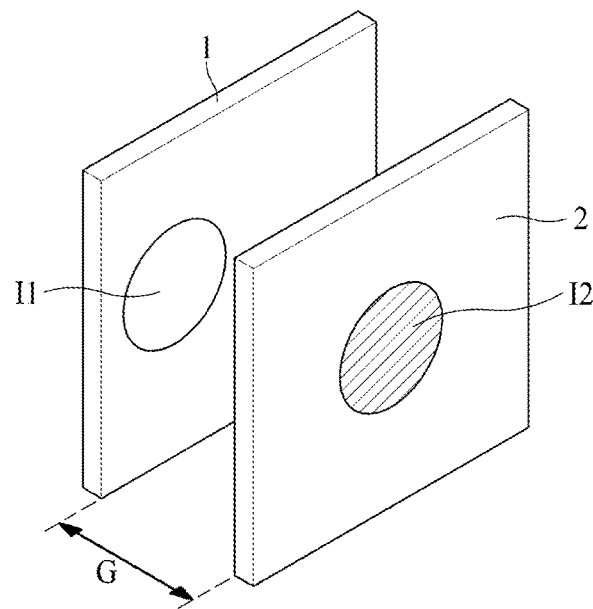
FIG. 1 is a diagram schematically illustrating a related art stereoscopic display device.

Reference will now be made in detail to the exemplary embodiments of the present disclosure, examples of which are illustrated in the accompanying drawings. Wherever possible, the same reference numbers will be used throughout the drawings to refer to the same or like parts.

The terms described in the specification should be understood as follows.

The terms described in the specification should be understood as follows. As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of a stereoscopic display device according to the present disclosure will be described in detail with reference to the accompanying drawings. Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship. In the specification, in adding reference numerals for elements in each drawing, it should be noted that like reference numerals already used to denote like elements in other drawings are used for elements wherever possible.

Figure 2:
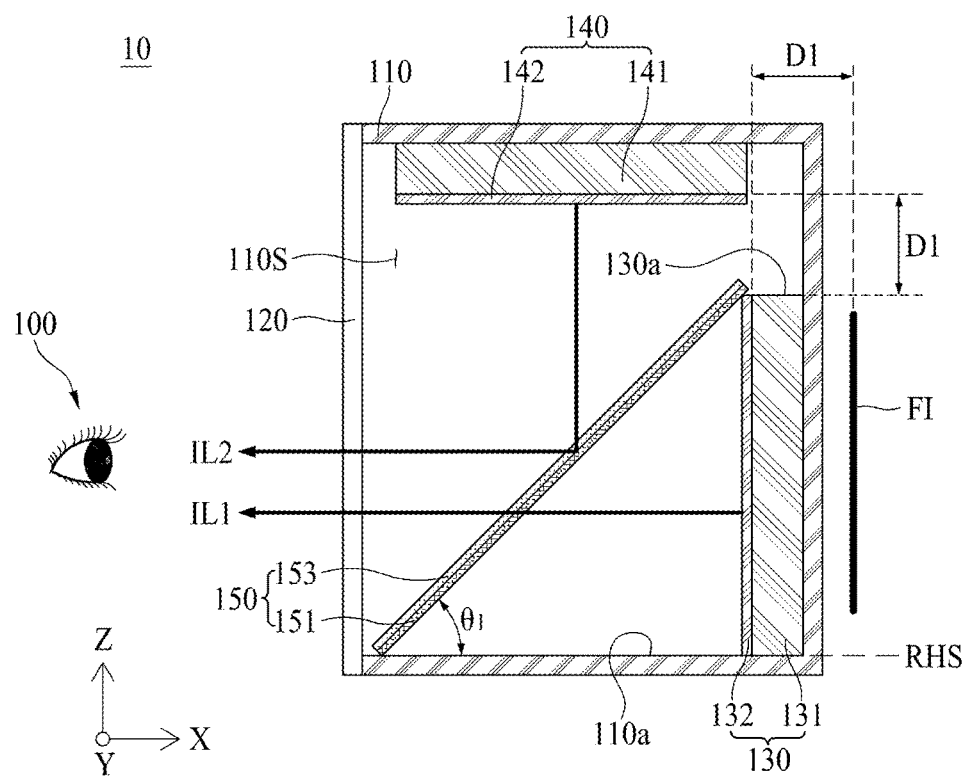
FIG. 2 is a diagram illustrating a stereoscopic display device according to an embodiment of the present disclosure.
Figure 3:
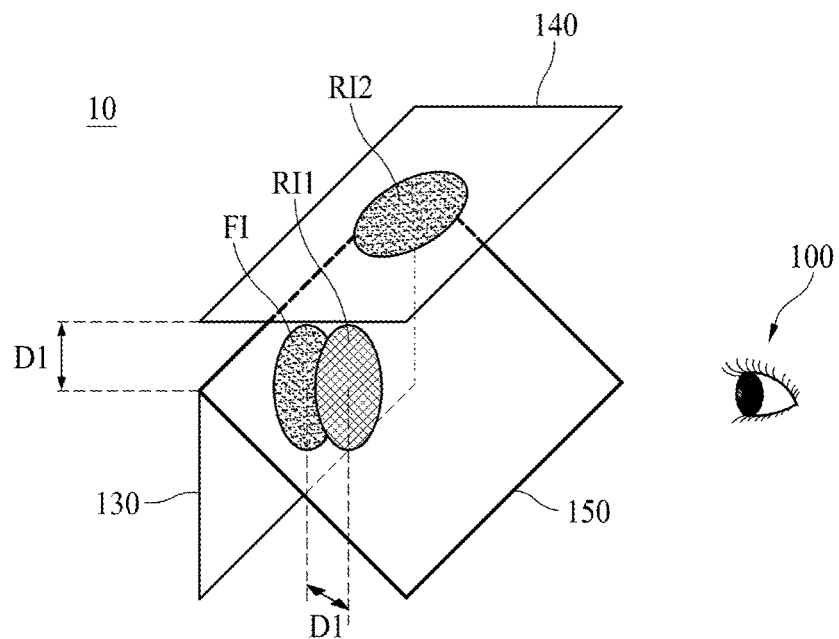
FIG. 3 is a diagram illustrating a stereoscopic image realized in the stereoscopic display device illustrated in FIG. 2.

FIG. 2 is a diagram illustrating a stereoscopic display device 10 according to an embodiment of the present disclosure, and FIG. 3 is a diagram illustrating a stereoscopic image realized in the stereoscopic display device illustrated in FIG. 2.

Referring to FIGS. 2 and 3, the stereoscopic display device 10 according to an embodiment of the present disclosure may include a housing 110, a cover window 120, a first display 130, a second display 140, and a semi-transmissive optical member 150.

The housing 110 may have a box shape including an accommodation space 110S and one opening which externally opens one side of the accommodation space 110S. That is, the housing 110 may include a lower plate, an upper plate, a front plate, a rear plate, and a pair of side wall plates, which surround the accommodation space 110S, and may have a box shape where the front plate is removed.

The cover window 120 may be coupled to a front portion of the housing 110 to cover the one opening of the housing 110. Here, the cover window 120 may be formed of a transparent glass or a transparent plastic.

The first display 130 may be installed in the accommodation space 110S of the housing 110 in parallel with the cover window 120 and may display a first image RI1. The first display 130 may be vertically disposed along a vertical axis direction vertical to a reference horizontal surface RHS with respect to an inner surface 110a of the lower plate. The first display 130 may be disposed behind the semi-transmissive optical member 150 or between the rear plate of the housing 110 and the semi-transmissive optical member 150 with respect to a first horizontal axis direction X. Therefore, a screen of the first display 130 may face a first light incident surface of the semi-transmissive optical member 150. Here, the first horizontal axis direction X may be defined as a direction parallel to the reference horizontal surface RHS, and in more detail, may be defined as a direction parallel to a rectilinear direction between the first display 130 and the cover window 120. Also, a second horizontal axis direction Y may be defined as a direction intersecting the first horizontal axis direction X.

The first display 130 according to an embodiment may include a first display panel 131, which displays the first image RI1, and a first polarization member 132 which is disposed on a front surface of the first display panel 131 to polarize a first-image light IL1 to a first polarization state.

The first display panel 131 may be configured with a liquid crystal display panel, a plasma display panel, an organic light emitting display panel, a micro light emitting diode display panel, or the like.

The first polarization member 132 may include a first polarization axis for polarizing the first-image light IL1 which is incident from the first display panel 131, to the first polarization state. That is, the first polarization member 132 may include a first-direction transmissive axis and a second-direction absorption axis perpendicular to the first direction. For example, the first-image light IL1 may be polarized to a P polarization state by the first polarization member 132.

The second display 140 may be installed in the accommodation space 110S of the housing 110 in parallel with the first horizontal axis direction X perpendicular to an installation direction Z of the first display 130 and may display a second image RI2. The second display 140 may be horizontally disposed in parallel with the lower plate. That is, the second display 140 may be installed in the upper plate (or a ceiling plate) of the housing 110 adjacent to the cover window 120, and thus, may be disposed on the semi-transmissive optical member 150 with respect to a vertical axis direction Z. Therefore, a screen of the second display 140 may face a second light incident surface of the semi-transmissive optical member 150. The second display 140 may have the same size as that of the first display 130.

The second display 140 according to an embodiment may include a second display panel 141, which displays the second image RI2, and a second polarization member 142 which is disposed on a front surface of the second display panel 141 to polarize a second-image light IL2 to a second polarization state vertical to the first polarization state.

The second display panel 141 may be configured with a liquid crystal display panel, a plasma display panel, an organic light emitting display panel, a micro light emitting diode display panel, or the like. Alternatively, the second display panel 141 may be the same as the first display panel 131.

The second polarization member 142 may include a second polarization axis for polarizing the second-image light IL2, which is incident from the second display panel 141, to the second polarization state. That is, the second polarization member 142 may include a second-direction transmissive axis and a first-direction absorption axis. For example, the second-image light IL2 may be polarized to an S polarization state by the second polarization member 142.

The first image RI1 according to an embodiment may be defined as a foreground image which is displayed close to the cover window 120, and the second image RI2 may be defined as a background image which is displayed behind the first image RI1. However, the present embodiment is not limited thereto. In other embodiments, one of the foreground image and the background image may be the first image RI1, and the other may be the second image RI2.

The semi-transmissive optical member 150 may be disposed between the first and second displays 130 and 140, and in more detail, may be disposed between the cover window 120 and the first display 130 with respect to the first horizontal axis direction X, and may be under the second display 140 with respect to the vertical axis direction Z and may be inclined at a certain angle. The semi-transmissive optical member 150 may be disposed between the lower plate of the housing 110 and a top 130*a* of the first display 130 and may be inclined at a first angle "θ1" from the reference horizontal surface RHS of the housing 110. The first angle "θ1" between the semi-transmissive optical member 150 and the reference horizontal surface RHS may be set to 45 degrees.

The semi-transmissive optical member 150 may include a first light incident surface facing the screen of the first display 130 and a second light incident surface facing the screen of the second display 140. The semi-transmissive optical member 150 may transmit the first-image light IL1 which is incident on the first light incident surface from the first display 130, toward the cover window 120 and may reflect the second-image light IL2, which is incident on the second light incident surface from the second display 140, toward the cover window 120. To this end, the semi-transmissive optical member 150 may include a polarization transmissive axis, which transmits the first-image light IL1 and a polarization reflective axis, which reflects the second-image light IL2.

The semi-transmissive optical member 150 according to an embodiment may include a transparent supporting plate 151 and a reflective polarization film 153.

The transparent supporting plate 151 may be a transparent glass or a transparent plastic plate. The transparent supporting plate 151 may be disposed and inclined between the lower plate of the housing 110 and the top 130*a* of the first display 130 to have a slope of the first angle "θ1" from the reference horizontal surface RHS.

The reflective polarization film 153 may have an optical characteristic which reflects one of two linear polarization components of incident light and transmits the other linear polarization component. The reflective polarization film 153 may include a polarization transmissive axis, which matches a first transmissive axis of the first polarization member 132, and a polarization reflective axis which matches a second transmissive axis of the second polarization member 142. The reflective polarization film 153 according to an embodiment may be, for example, a dual brightness enhancement film (DBEF) manufactured by Minnesota Mining and Manufacturing company.

According to an experiment, the semi-transmissive optical member 150 using the DBEF as the reflective polarization film 153 may have a transmittance of 93% and a reflectivity of 90%. Therefore, in the semi-transmissive optical member 150, a sum of the transmittance and the reflectivity may be more than 100%, and thus, a luminance of a stereoscopic image is considerably enhanced.

The semi-transmissive optical member 150 may be replaced with a semi-transmissive mirror (or a half mirror). However, since the semi-transmissive mirror transmits some of incident light and reflects the other light, the semi-transmissive mirror may have a transmittance of about 50% and a reflectivity of about 50%, and a sum of the transmittance and the reflectivity may not be more than 100%. Therefore, in a case where the semi-transmissive mirror (or the half mirror) is used instead of the semi-transmissive optical member 150, a luminance of an image is reduced due to a low transmittance of the semi-transmissive mirror (for example, a transmittance of 50%), and for this reason, it is unable to realize a vivid and realistic stereoscopic image. Accordingly, in the present embodiment, by using the semi-transmissive optical member 150 which has a transmittance of 90% or more and a reflectivity of 90% or more or where a sum of the transmittance and the reflectivity is more than 100%, the first and second images RI1 and RI2 may be transmitted or reflected based on respective polarization states of the first and second images RI1 and RI2, and thus, a luminance of a stereoscopic image is considerably enhanced in comparison with the semi-transmissive mirror.

In the semi-transmissive optical member 150, since the polarization transmissive axis of the reflective polarization film 153 matches the transmissive axis of the first polarization member 132, the first-image light IL1 incident from the first display 130 may be transmitted toward the cover window 120, and since the polarization reflective axis of the reflective polarization film 153 matches the transmissive axis of the second polarization member 131, the second-image light IL2 incident from the second display 140 may be reflected toward the cover window 120. Therefore, a watcher 100 may look at a first image RI1 and a floating image (or a virtual image) FI, which is generated based on the second image RI2 and displayed behind the first display 130, by using the first-image light IL1 passing through the semi-transmissive optical member 150 and the second-image light IL2 reflected by the semi-transmissive optical member 150 in front of the cover window 120, and thus, may recognize a stereoscopic image based on the first image RI1 and the floating image FI having different depths.

Generally, in a plane mirror, an image at which the watcher 100 looks may be a virtual image mirrored in a rear region spaced apart from the plane mirror by a distance between the plane mirror and the watcher 100. According to the principle such as a virtual image mirrored in the plane mirror, the second display 140 according to the present embodiment may be vertically spaced apart from the top 130a of the first display 130 by a first distance D1 in the first vertical axis direction Z, and thus, the second image RI2 displayed on the second display 140 may be displayed as the floating image FI on a rear region which is behind the first display 130 and is spaced apart from the first display 130 by the first distance D1. In this case, the second display 140 may be disposed in a plane type with respect to the semi-transmissive optical member 150, and thus, the floating image FI may be realized as an invert virtual image which has the same size as that of the first image RI1 and has the same depth from the first display 130. For example, in FIG. 2, when each of the first and second displays 130 and 140 has a widthwise size of 128 mm, the first distance D1 between the first and second displays 130 and 140 is 10 mm, and the semi-transmissive optical member 150 is inclined at an angle "θ1" of 45 degrees, the floating image FI may be vertically displayed to have a widthwise size of 128 mm in the rear spaced apart from the first display 130 by a distance of 10 mm.

In the stereoscopic display device 10 according to the present embodiment, the semi-transmissive optical member 150 may be disposed and inclined between the first and second displays 130 and 140 vertical to each other, and a foreground image and a background image having different polarization states may be transmitted and reflected through the semi-transmissive optical member 150, thereby realizing a vivid and realistic stereoscopic image having high luminance and a high resolution. That is, the stereoscopic display device 10 according to the present embodiment may realize the first image RI1 displayed on the first display 130 and the floating image FI based on the second image RI2 displayed on the second display 140, thereby realizing a vivid and realistic stereoscopic image having high luminance and a high resolution.

Figure 4:
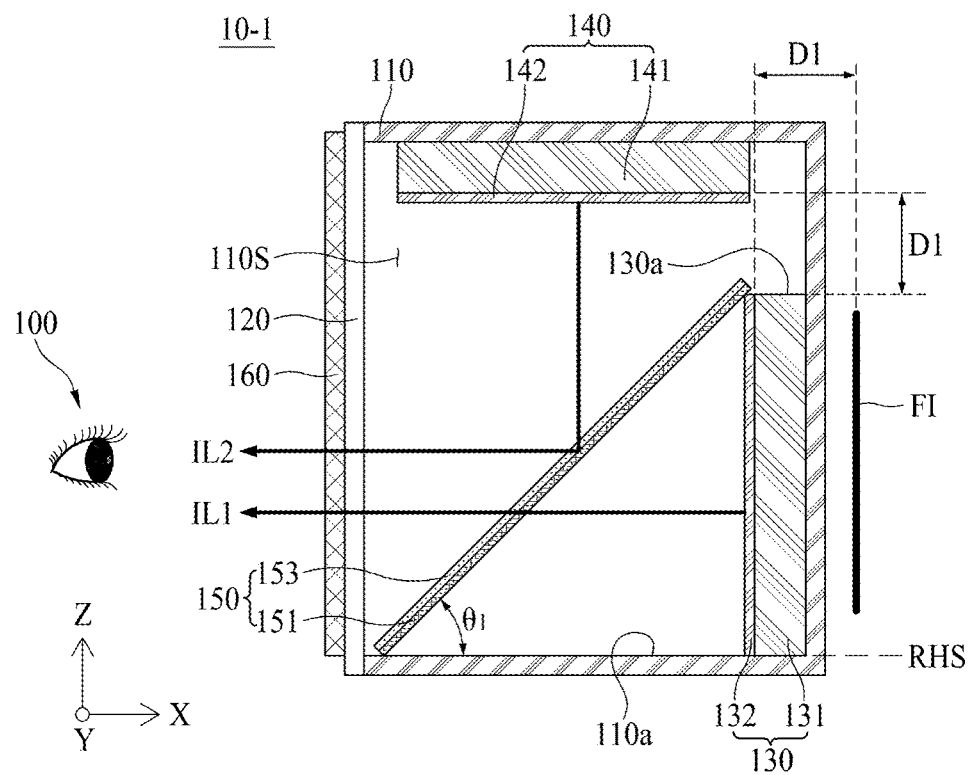
FIG. 4 is a diagram for describing a modification embodiment of a stereoscopic display device according to an embodiment of the present disclosure.

FIG. 4 is a diagram for describing a modification embodiment of a stereoscopic display device according to an embodiment of the present disclosure and illustrates an example where a quarter-wave plate 160 is added to the stereoscopic display device 10 illustrated in FIG. 2. Hereinafter, only the quarter-wave plate 160 will be described, and repetitive descriptions of the other elements are not repeated.

Referring to FIG. 4, in a stereoscopic display device 10-1 according to the present modification embodiment, the quarter-wave plate 160 may be disposed in front of a cover window 120. That is, the quarter-wave plate 160 may be attached on a front surface of the cover window 120.

The quarter-wave plate 160 may change a first-image light IL1 which passes through a semi-transmissive optical member 150 and is incident thereon, to a third polarization state and may change a second-image light IL2, which is reflected by the semi-transmissive optical member 150 and is incident thereon, to a fourth polarization state. Here, the third polarization state may be a left-circular polarization state, and the fourth polarization state may be a right-circular polarization state. However, the present embodiment is not limited thereto. In other embodiments, the third polarization state may be the right-circular polarization state, and the fourth polarization state may be the left-circular polarization state.

In a case where the watcher 100 looks at a stereoscopic image in a state of wearing polarization glasses, the quarter-wave plate 160 may be applied in order for the watcher 100 to normally look at the stereoscopic image. For example, if all of the polarization glasses have a first polarization axis, the watcher 100 cannot look at the first image blocked by the polarization glasses. Accordingly, the quarter-wave plate 160 may change each of the first and second images passing through the cover window 120 to a circular polarization state, thereby enabling the watcher 100 to normally look at each of the first and second images.

The stereoscopic display device 10-1 according to the present modification embodiment may further include the quarter-wave plate 160, thereby providing the same effect as that of the stereoscopic display device 10 illustrated in FIG. 2 and providing the first and second images and a stereoscopic image based on a combination thereof to the watcher 100 wearing the polarization glasses.

Figure 5:
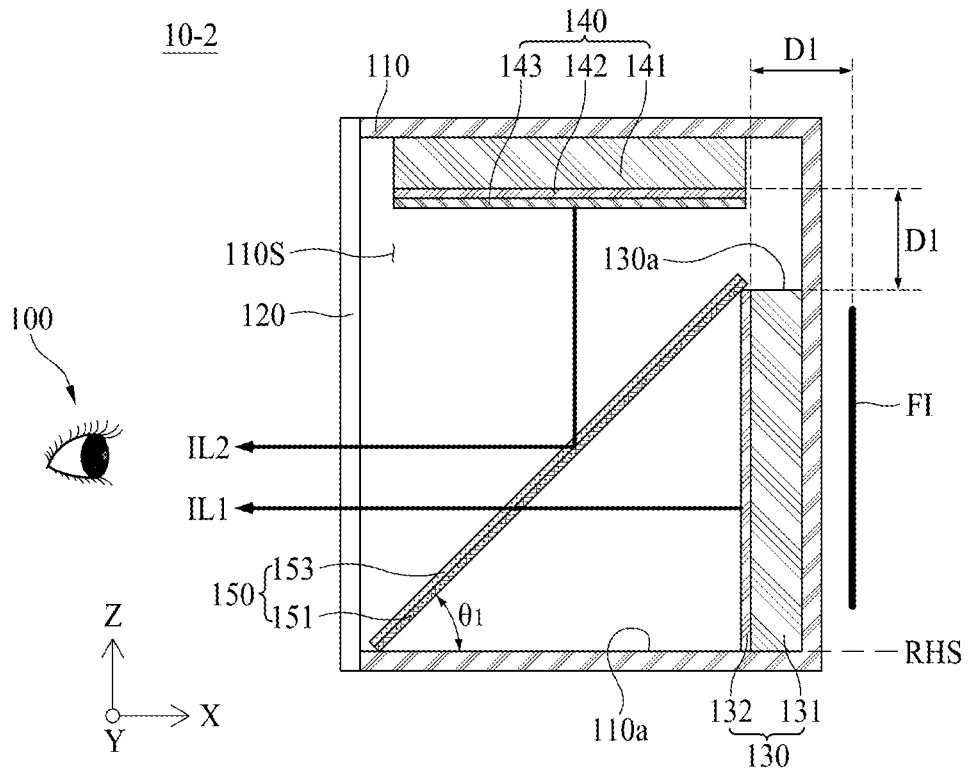
FIG. 5 is a diagram for describing another modification embodiment of a stereoscopic display device according to an embodiment of the present disclosure.

FIG. 5 is a diagram for describing another modification embodiment of a stereoscopic display device according to an embodiment of the present disclosure and illustrates an example where a configuration of the second display 140 of the stereoscopic display device 10 illustrated in FIG. 2 has been modified. Hereinafter, only a second display 140 will be described, and repetitive descriptions of the other elements are not repeated.

Referring to FIG. 5, in a stereoscopic display device 10-2 according to the present modification embodiment, the second display 140 may include a second display panel 141 which displays a second image, a second polarization member 142 which is disposed on a front surface of the second display panel 141 to polarize a second-image light IL2 to a first polarization state, and a half-wave plate 143 which is disposed in front of the second polarization member 142 to change the second-image light, polarized to the first polarization state, to a second polarization state vertical to the first polarization state.

The second display panel 141 may be configured with a liquid crystal display panel, a plasma display panel, an organic light emitting display panel, a micro light emitting diode display panel, or the like.

The second polarization member 142 may include a first polarization axis for polarizing the second-image light, which is incident from the second display panel 141, to the first polarization state. That is, the second polarization member 142 may include a first-direction transmissive axis and a second-direction absorption axis, identically to a first polarization member 132 of a first display 130. For example, the second-image light IL2 may be polarized to a P polarization state by the second polarization member 142.

The half-wave plate 143 may be disposed in front of the second polarization member 142 and may change the second-image light IL2, which is polarized to the first polarization state by the second polarization member 142 and is incident thereon, to the second polarization state. That is, the half-wave plate 143 may rotate a polarization direction of the second image by 90 degrees to change the second-image light IL2 to the second polarization state, so that the second-image light IL2 which is polarized to the first polarization state and is incident thereon is reflected by the semi-transmissive optical member 150. Therefore, the second-image light IL2 changed to the second polarization state by the half-wave plate 143 may match a polarization reflective axis of the above-described semi-transmissive optical member 150, and thus, the second-image light IL2 may be reflected toward the cover window 120 by the semi-transmissive optical member 150.

The stereoscopic display device 10-2 according to the present modification embodiment may use the same polarization members 132 and 142 applied to the first and second displays 130 and 140, but may further include the half-wave plate 143 provided in the second display 140, thereby providing the same effect as that of the stereoscopic display device 10 illustrated in FIG. 2.

Figure 6:
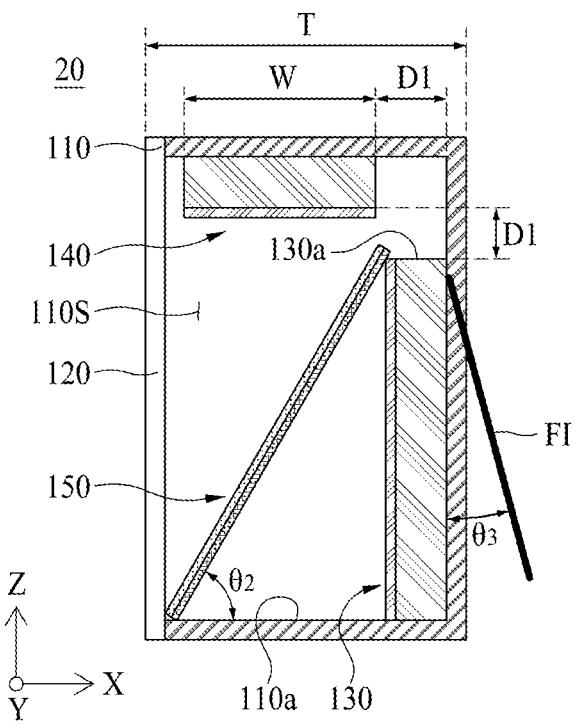
FIG. 6 is a diagram illustrating a stereoscopic display device according to another embodiment of the present disclosure.

FIG. 6 is a diagram illustrating a stereoscopic display device 20 according to another embodiment of the present disclosure and illustrates an example where a slope of the semi-transmissive optical member 150 in the stereoscopic display devices 10, 10-1, and 10-2 illustrated in FIGS. 2 to 5 has been modified. Hereinafter, only a semi-transmissive optical member 150 will be described, and repetitive descriptions of the other elements are not repeated.

Referring to FIG. 6, in the stereoscopic display device 20 according to another embodiment of the present disclosure, a semi-transmissive optical member 150 may be disposed between a lower plate of a housing 110 and a top 130a of a first display 130 and may be inclined at a second angle "θ2" from a reference horizontal surface RHS of the housing 110. The second angle "θ2" between the semi-transmissive optical member 150 and the reference horizontal surface RHS may be set to more than 45 degrees and 75 degrees or less, and may be set to 45 degrees to 65 degrees for preventing distortion of a floating image FI.

When the semi-transmissive optical member 150 is inclined at the second angle "θ2", a second image displayed on a second display 140 may be reflected by the semi-transmissive optical member 150, and thus, an inclined floating image FI may be displayed behind the first display 130, based on an inclined angle "θ2" of the semi-transmissive optical member 150. That is, the floating image FI may be displayed on a rear region which is behind the first display 130 and is spaced apart from the first display 130 by a first distance D1 between the second display 140 and the top 130a of the first display 130 and may be inclined at a third angle "θ3", calculated as "2*θ2−π/2", from a vertical axis direction Z. In this case, the floating image FI may have a depth which progressively increases in a direction from an upper portion to a lower portion of the first display 130 with respect to the vertical axis direction Z.

Therefore, in the stereoscopic display device 20 according to another embodiment of the present disclosure, the inclined angle "θ2" of the semi-transmissive optical member 150 may be set to 45 degrees to 65 degrees, and thus, when seen from the side, the floating image FI corresponding to the second image displayed on the second display 140 may be displayed and inclined, whereby position-based depths of the floating image FI may differ.

Moreover, in the stereoscopic display device 20 according to another embodiment of the present disclosure, the floating image FI may be slopingly displayed, and thus, even when a widthwise size W of the second display 140 is reduced based on a slope of the floating image FI, the floating image FI having the same size as that of the first image RI1 may be realized. Also, as the widthwise size W of the second display 140 is reduced, a size T between the cover window 120 and the first display 130 may be reduced, and thus, the stereoscopic display device 20 may be slimmed.

Figure 7:
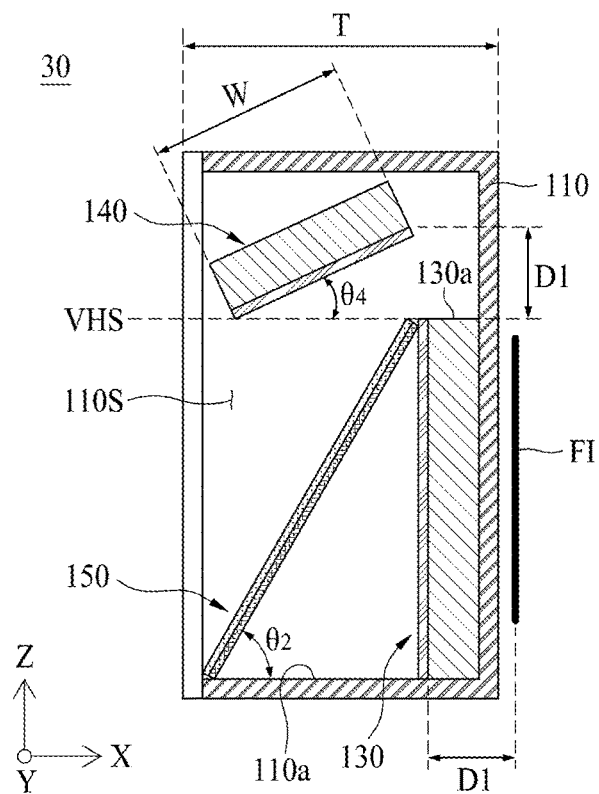
FIG. 7 is a diagram illustrating a stereoscopic display device according to another embodiment of the present disclosure.

FIG. 7 is a diagram illustrating a stereoscopic display device 30 according to another embodiment of the present disclosure and illustrates an example where the second display 140 of the stereoscopic display device 20 illustrated in FIG. 6 is slopingly disposed. Hereinafter, only a second display 140 and elements relevant thereto will be described, and repetitive descriptions of the other elements are not repeated.

Referring to FIG. 7, in the stereoscopic display device 30 according to another embodiment of the present disclosure, the second display 140 may have a size which is less than that of the first display 130, and may be slopingly disposed in parallel with a reference horizontal surface RHS to have a slope of a fourth angle "θ4" from a virtual horizontal surface VHS which extends from a top 130a of a first display 130. In this case, one end of the second display 140 adjacent to the cover window 120 may be disposed on the virtual horizontal surface VHS, and a distance between the second display 140 and the virtual horizontal surface VHS may progressively increase in a direction from the one end of the second display 140 to the other end of the second display 140 adjacent to the first display 130. The fourth angle "θ4" may be set based on a condition of a floating image FI which is to be displayed.

When seen from the side, the floating image FI may be vertically or slopingly displayed based on a first inclined angle "θ2" of a semi-transmissive optical member 150 and a second inclined angle "θ4" of the second display 140. For example, in a case where a value of |2*θ2−θ4| is 90, when seen from the side, the floating image FI may be displayed as an erect virtual image on a rear region which is behind the first display 130 and is spaced apart from the first display 130 by a first distance D1. As another example, in a case where the value of |2*θ2−θ4| is less than 90, when seen from the side, the floating image FI may be displayed on a rear region which is behind the first display 130 and is spaced apart from the first display 130 by the first distance D1, and in this case, the floating image FI may be displayed progressively farther away from the first display 130 in a direction from a lower end to an upper end of the first display 130 and thus may have a depth which progressively increases in a direction from the lower end to the upper end of the first display 130. As another example, in a case where the value of |2*θ2−θ4| is greater than 90, when seen from the side, the floating image FI may be slopingly displayed on a rear region which is behind the first display 130 and is spaced apart from the first display 130 by the first distance D1, and in this case, the floating image FI may be displayed progressively farther away from the first display 130 in a direction from the upper end to the lower end of the first display 130 and thus may have a depth which progressively increases in a direction from the upper end to the lower end of the first display 130.

For example, in FIG. 7, in a case where the first display 130 has a height of 128 mm, the second display 140 is inclined at the angle "θ4" of 10 degrees, and the semi-transmissive optical member 150 is inclined at an angle "θ2" of 50 degrees, since the value of |2*θ2−θ4| is 90, the floating image FI may be vertically displayed to have a height of 104 mm on the rear spaced apart from the first display 130 by a distance of 18.7 mm. In this case, in the stereoscopic display device 30 according to another embodiment of the present disclosure, a total widthwise size T may be reduced from 128 mm to 107 mm, and a widthwise size W of the second display 140 may be reduced from 128 mm to 106 mm in comparison with the stereoscopic display device illustrated in FIG. 2.

Therefore, in the stereoscopic display device 30 according to another embodiment of the present disclosure, the floating image FI corresponding to a second image displayed on the second display 140 may be vertically or slopingly displayed based on the first inclined angle "θ2" of the semi-transmissive optical member 150 and the second inclined angle "θ4" of the second display 140, and thus, position-based depths of the floating image FI may differ. Also, in the stereoscopic display device 30 according to another embodiment of the present disclosure, since the widthwise size W of the second display 140 is reduced, the total widthwise size T may be reduced.

Figure 8:
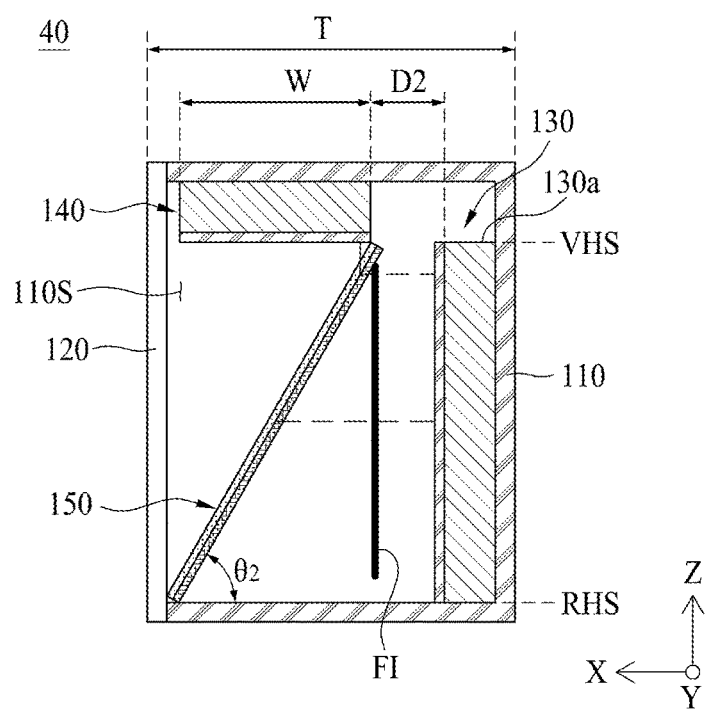
FIG. 8 is a diagram illustrating a stereoscopic display device according to another embodiment of the present disclosure.
Figure 9:
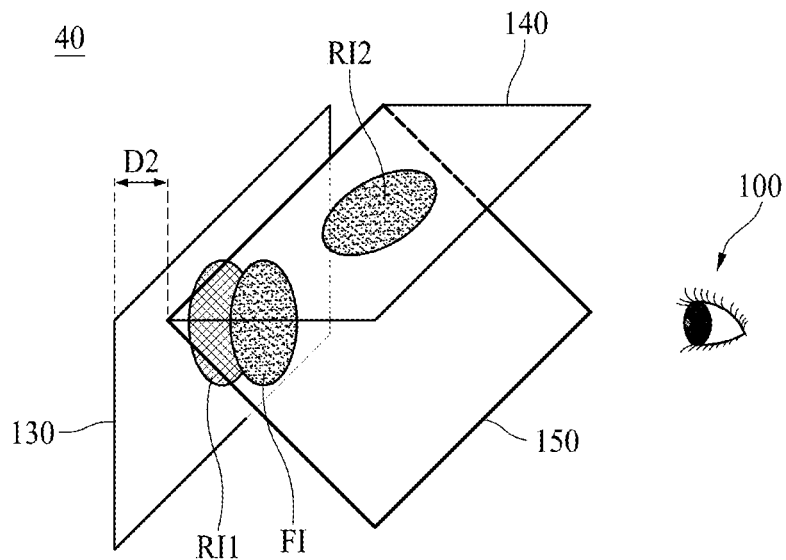
FIG. 9 is a diagram illustrating a stereoscopic image realized in the stereoscopic display device illustrated in FIG. 8.

FIG. 8 is a diagram illustrating a stereoscopic display device 40 according to another embodiment of the present disclosure, and FIG. 9 is a diagram illustrating a stereoscopic image realized in the stereoscopic display device illustrated in FIG. 8. FIGS. 8 and 9 illustrate an example where a widthwise size of the second display 140 in the stereoscopic display devices 10, 10-1, and 10-2 illustrated in FIGS. 2 to 5 has been modified. Hereinafter, only a second display 140 and elements relevant thereto will be described, and repetitive descriptions of the other elements are not repeated.

Referring to FIGS. 8 and 9, in the stereoscopic display device 40 according to another embodiment of the present disclosure, a second display 140 may have a widthwise size W which is relatively less than that of a first display 130, and may be spaced apart from the first display 130 by a second distance D2 in a direction toward the cover window 120. Also, the second display 140 may be horizontally displayed on a virtual horizontal surface VHS, which extends from a top 130a of the first display 130, in parallel with a reference horizontal surface RHS. That is, the second display 140 may be disposed on the same plane as the virtual horizontal surface VHS.

An inclined angle of a semi-transmissive optical member 150 may be set to 45 degrees to 65 degrees from the reference horizontal surface RHS of a housing 110, between a lower plate of the housing 110 and the top 130a of the first display 130. In this case, an upper surface of the semi-transmissive optical member 150 adjacent to the top 130a of the first display 130 may be disposed to face a bottom of the second display 140.

In the stereoscopic display device 40 according to another embodiment of the present disclosure, since the second display 140 is spaced apart from the first display 130 by the second distance D2 in the direction toward the cover window 120, a second image RI2 displayed on the second display 140 may be reflected by the semi-transmissive optical member 150, and thus, may be realized as a floating image FI in a front region which is in front of the first display 130 and is spaced apart from the first display 130 by the second distance D2. In this case, the second display 140 may be horizontally disposed with respect to the semi-transmissive member 150, and thus, when seen from the side, the floating image FI may be realized as an erect virtual image between the semi-transmissive member 150 and the first display 130. Therefore, a watcher 100 may look at the first image RI1 and the floating image FI, which is generated based on the second image RI2 and displayed in front of the first display 130, by using a first-image light passing through the semi-transmissive optical member 150 and a second-image light reflected by the semi-transmissive optical member 150 in front of the cover window 120, and thus, may recognize a stereoscopic image based on the first image RI1 and the floating image FI having different depths.

Figure 10:
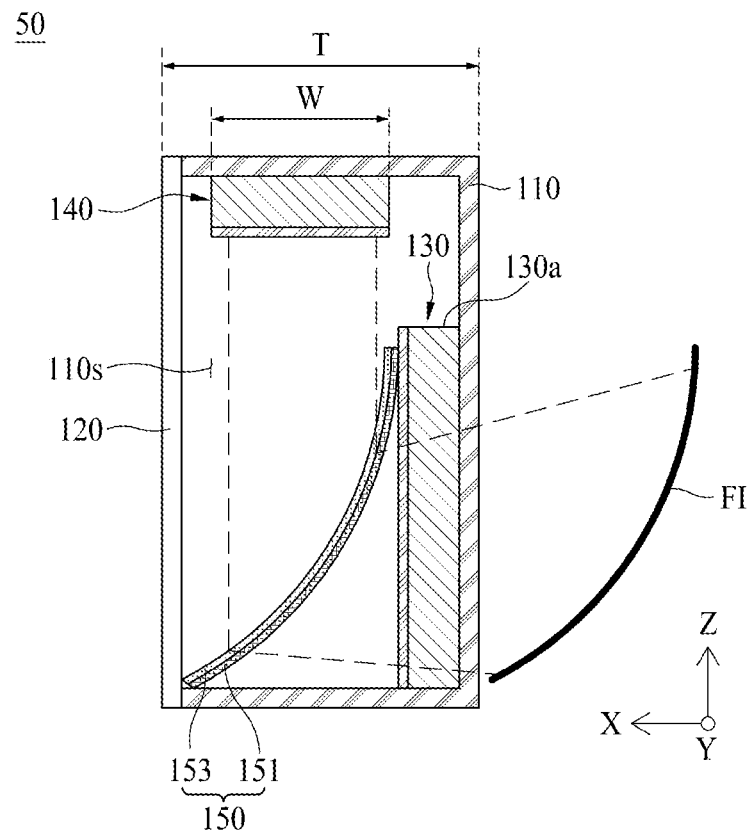
FIG. 10 is a diagram illustrating a stereoscopic display device according to another embodiment of the present disclosure.

FIG. 10 is a diagram illustrating a stereoscopic display device 50 according to another embodiment of the present disclosure and illustrates an example where a structure of the semi-transmissive optical member 150 in the stereoscopic display device 40 illustrated in FIGS. 8 and 9 has been modified. Hereinafter, only a semi-transmissive optical member 150 and elements relevant thereto will be described, and repetitive descriptions of the other elements are not repeated.

Referring to FIG. 10, in the stereoscopic display device 50 according to another embodiment of the present disclosure, the semi-transmissive optical member 150 may be provided to have a curved shape which protrudes toward a first display 130, and may be disposed between a lower plate of a housing 110 and a top 130a of the first display 130. The semi-transmissive optical member 150 may have a curvature for enlarging a size of a second image, displayed on a second display 140, to a size of a first image displayed on the first display 130. The semi-transmissive optical member 150 may include a transparent supporting plate 151 and a reflective polarization film 153. Except that the transparent supporting plate 151 and the reflective polarization film 153 each have a curved shape, the semi-transmissive optical member 150 is as described above, and thus, its repetitive description is not repeated.

The semi-transmissive optical member 150 may transmit a first-image light, output from the first display 130, toward a cover window 120 and may reflect a second-image light, output from the second display 140, toward the cover window 120. In this case, the second image displayed on the second display 140 may be reflected by the semi-transmissive optical member 150 to have a size which is less than that of the first image displayed on the first display 130, and thus, may be enlarged in up, down, left, and right directions according to the curvature of the semi-transmissive optical member 150 and may be displayed as a floating image FI. That is, the floating image FI may be enlarged and displayed to have a curved shape corresponding to the curvature of the semi-transmissive optical member 150 in a rear region which is behind the first display 130 and is spaced apart from the first display 130 by a first distance D1 between the second display 140 and the top 130a of the first display 130. In this case, when seen from the side, the floating image FI may have a curved shape having a depth which is relatively deeper in a lower portion than an upper portion.

In addition, in the stereoscopic display device 50 according to the present embodiment, the second display 140 may be disposed along at least one of a first horizontal axis direction X and a vertical axis direction Z and may be spaced apart from the first display 130. In this case, in the present embodiment, the floating image FI may be displayed in front of or behind the first display 130, based on a disposed position of the second display 140 with respect to the first display 130.

Therefore, in the stereoscopic display device 50 according to the present embodiment, by using the semi-transmissive optical member 150 having a curved shape, the floating image FI corresponding to the second image having a size which is less than that of the first image may be enlarged and displayed to have the same size as that of the first image, and thus, position-based depths of the floating image FI may differ. Also, in the stereoscopic display device 50 according to the present embodiment, since a widthwise size W of the second display 140 is reduced, a total widthwise size T may be reduced.

Figure 11:
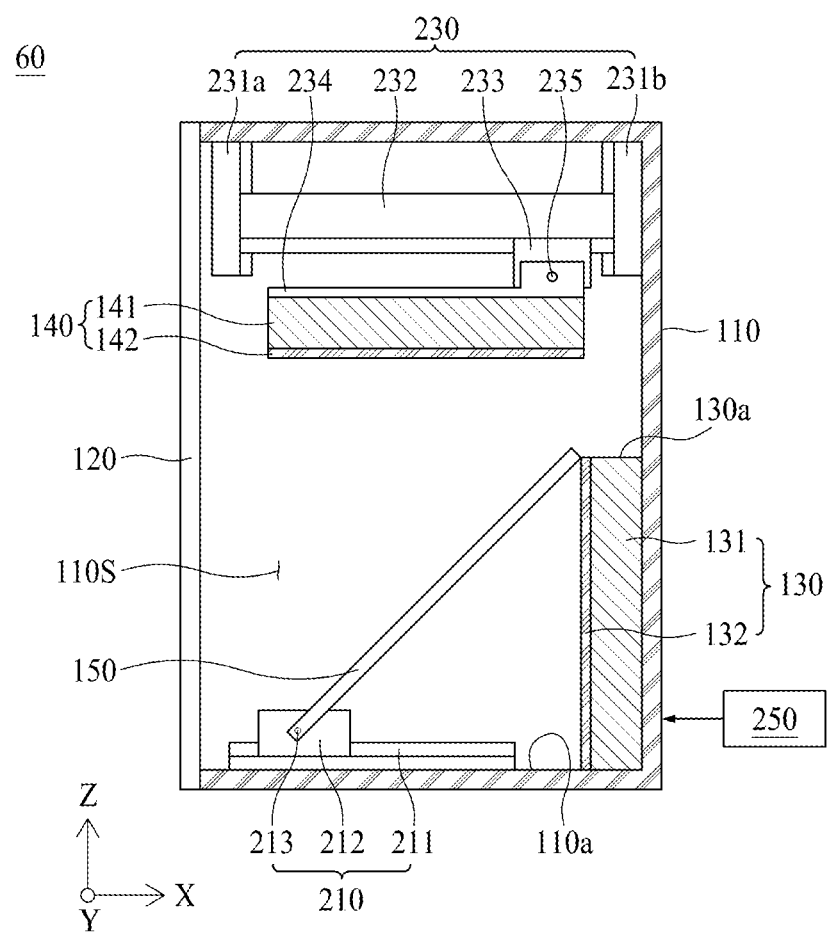
FIG. 11 is a diagram illustrating a stereoscopic display device according to another embodiment of the present disclosure.

FIG. 11 is a diagram illustrating a stereoscopic display device 50 according to another embodiment of the present disclosure and illustrates an example where a first driver, a second driver, and a controller are added to the stereoscopic display devices 10, 10-1, 10-2, 20, 30, 40, and 50 illustrated in FIGS. 2 to 10. Hereinafter, only a driver and a controller and elements relevant thereto will be described, and repetitive descriptions of the other elements are not repeated.

Referring to FIG. 11, in the stereoscopic display device 50 according to another embodiment of the present disclosure, a first driver 210 may adjust an inclined angle of a semi-transmissive optical member 150. That is, the first driver 210 may be installed on a lower plate of a housing 110 to support the semi-transmissive optical member 150 and may move the semi-transmissive optical member 150 along a first horizontal axis direction X or may adjust the angle of the semi-transmissive optical member 150.

The first driver 210 according to an embodiment may include a first guide rail 211, a first movement block 212, a first block movement unit, and a first rotation member.

The first guide rail 211 may be installed on the lower plate of the housing 110 corresponding between a cover window 120 and the first display 130 along the first horizontal axis direction X. The first guide rail 211 may guide a rectilinear motion of the first movement block 212.

The first movement block 212 may be movably installed on the first guide rail 211 and may rotatably support a lower end of the semi-transmissive optical member 150. In this case, the first movement block 212 may rotatably support a first hinge shaft 213 coupled to the lower end of the semi-transmissive optical member 150.

The first block movement unit may rectilinearly move the first movement block 212 on the first guide rail 211. The first block movement unit according to an embodiment may include a first ball screw installed on the first guide rail 211, a first ball catch installed in the first movement block 212 and coupled to the first ball screw, and a first driving motor that rotates the first ball screw. The first block movement unit may rectilinearly move the first ball catch through a rotational motion of the first ball screw based on a rotation of the first driving motor to rectilinearly move the first movement block 212, coupled to the first ball catch, on the first guide rail 211 along the first horizontal axis direction X.

The first rotation member may include a first rotation motor coupled to the first hinge shaft 213. The first rotation motor may rotate the first hinge shaft 213 to adjust the inclined angle of the semi-transmissive optical member 150.

The first driver 210 according to an embodiment may adjust the inclined angle of the semi-transmissive optical member 150 through a rotation of the first rotation motor, and then, may move the first movement block 212 toward a first display 130 through driving of the first driving motor to allow an upper portion of the angle-adjusted semi-transmissive optical member 150 to be closely adhered to an upper portion of the first display 130, thereby setting the inclined angle of the semi-transmissive optical member 150. The first driver 210 according to an embodiment may set the inclined angle of the semi-transmissive optical member 150 through driving of the first rotation member, thereby realizing a floating image having the same depth from the first display 130 or a floating image which has different depths in a direction from an upper portion to a lower portion of the first display 130.

The second driver 230 may set a position and/or an angle of a second display 140. That is, the second driver 230 may be installed on an upper plate of the housing 110 to support the second display 140, and thus, may move the second display 140 in a vertical axis direction Z and/or the first horizontal axis direction X or may adjust an inclined angle of the second display 140.

The second driver 230 according to an embodiment may include a pair of elevation guiders 231a and 231b, a second guide rail 232, a rail elevation unit, a second movement block 233, a second block movement unit, a supporting bracket 234, and a second rotation member.

The pair of elevation guiders 231a and 231b may be installed in both edges of an upper plate of the housing 110 and may be spaced apart from each other with the second display 140 therebetween. The pair of elevation guiders 231a and 231b may guide a movement of the second guide rail 232.

The second guide rail 232 may be movably installed between the pair of elevation guiders 231a and 231b. The second guide rail 232 may guide a rectilinear motion of the second movement block 233.

The rail elevation unit may raise or lower the second guide rail 232 between the pair of elevation guiders 231a and 231b along the vertical axis direction Z. The rail elevation unit according to an embodiment may include a second ball screw installed in one of the pair of elevation guiders 231a and 231b, a second ball catch installed in one edge of the second guide rail 232 and coupled to the second ball screw, and a second driving motor that rotates the second ball screw. The rail elevation unit may rectilinearly move the second ball catch through a rotational motion of the second ball screw based on a rotation of the second driving motor to raise or lower the second guide rail 232, coupled to the second ball catch, between the pair of elevation guiders 231a and 231b along the vertical axis direction Z.

The second movement block may be movably installed on the second guide and may rotatably support one side of the supporting bracket 234. In this case, the second movement block 233 may rotatably support a second hinge shaft 235 coupled to the one side of the supporting bracket 234.

The second block movement unit may rectilinearly move the second movement block 233 on the second guide rail 232. The second block movement unit according to an embodiment may include a third ball screw installed on the second guide rail 232, a third ball catch installed in the second movement block 233 and coupled to the third ball screw, and a third driving motor that rotates the third ball screw. The second block movement unit may rectilinearly move the third ball catch through a rotational motion of the third ball screw based on a rotation of the third driving motor to rectilinearly move the second movement block 233, coupled to the third ball catch, on the second guide rail 232 along the first horizontal axis direction X.

The supporting bracket 234 may be movably installed in the second movement block 233 to support the second display 140. The supporting bracket 234 according to an embodiment may include a supporting plate coupled to a rear surface opposite to a screen of the second display 140, a pair of side walls which are provided vertically from both edges of one side of the supporting plate, and a pair of second hinge shafts 235 installed on the pair of side walls.

The second rotation member may include a second rotation motor coupled to one of the pair of second hinge shafts 235 provided in the supporting bracket 234. The second rotation motor may rotate the second hinge shaft 235 to adjust the inclined angle of the second display 140.

The second driver 230 according to an embodiment may raise or lower the second guide rail 232 in the vertical axis direction Z through driving of the rail elevation unit to adjust an interval (or a height) between the first display 130 and the second display 140 with respect to the vertical axis direction Z, thereby adjusting a position of a floating image displayed behind the first display 130. In this case, the floating image may be displayed on an area close to the rear of the first display 130 as the second display 140 get closer to a top of the first display 130.

The second driver 230 according to an embodiment may move the second movement block 233 in the first horizontal axis direction X through driving of the second block movement unit to adjust an interval (or a distance) between the first display 130 and the second display 140 with respect to the first horizontal axis direction X, thereby adjusting a position of a floating image displayed in front of the first display 130. In this case, the floating image may be displayed on an area close to a screen of the first display 130 as the second display 140 get closer to the screen of the first display 130.

The second driver 230 according to an embodiment may rotate one side of the supporting bracket 234 through driving of the second rotation member to adjust an inclined angle of the second display 140, thereby adjusting position-based depths of the floating image. The inclined angle of the second display 140 may be a factor that adjusts a depth of the floating image from the first display 130, with the inclined angle of the semi-transmissive optical member 150. The second driver 230 according to an embodiment may adjust the inclined angle of the second display 140 in cooperation with the second driver 230 to set a depth of the floating image identically to the stereoscopic display device 30 of FIG. 7.

The controller 250 may control driving of each of the first and second drivers 210 and 230 to adjust at least one of the angle of the semi-transmissive optical member 150 and the position and angle of the second display 140. In this case, the controller 250 may control driving of each of the first and second drivers 210 and 230 according to a different plurality of floating image modes which are previously set based on a combination of the angle of the semi-transmissive optical member 150 and the position and angle of the second display 140. That is, the controller 250 may set the angle of the semi-transmissive optical member 150 and the position and angle of the second display 140 according to a floating image mode selected from among the plurality of floating image modes by a watcher 100, thereby enabling the watcher 100 to watch a floating image desired by the watcher 100. For example, as in the stereoscopic display devices illustrated in FIGS. 2, 6, 7, and 8, the controller 250 may drive the first and second drivers 210 and 230 according to the selected floating image mode to set the angle of the semi-transmissive optical member 150 and the position and angle of the second display 140.

In addition, in FIG. 11, the semi-transmissive optical member 150 is illustrated as having a planar shape, but is not limited thereto. In other embodiments, the semi-transmissive optical member 150 may have the curved shape illustrated in FIG. 10.

Moreover, in FIG. 11, the stereoscopic display device 50 is illustrated as including all of the first and second drivers 210 and 230, but is not limited thereto. In other embodiments, the stereoscopic display device 50 may include at least one of the first and second drivers 210 and 230, in order to have a disposition structure of the semi-transmissive optical member 150 and the second display 140 illustrated in FIGS. 2, 6, 7, and 8. For example, the stereoscopic display device 50 may include only the first driver 210 for adjusting the angle of the semi-transmissive optical member 150, and in this case, the second display 140 may be spaced apart from the first display 130 by a certain distance along at least one of the vertical axis direction Z and the first horizontal axis direction X parallel to the lower plate of the housing 110 and may be horizontally fixed in parallel with the first horizontal axis direction X. As another example, the stereoscopic display device 50 may include only the second driver 230 that moves the second display 140 along at least one of the first horizontal axis direction X and the vertical axis direction Z, and in this case, the semi-transmissive optical member 150 may be slopingly installed to have an inclined angle which is set, and the second driver 230 may include or not include the second rotation member according to whether to adjust the angle of the second display 140.

As described above, the stereoscopic display device 50 according to the present embodiment may adjust the angle of the semi-transmissive optical member 150 and the position and angle of the second display 140, thereby providing the same effect as that of the stereoscopic display device according to the preceding embodiments and providing a floating image desired by a watcher.

Figure 12:
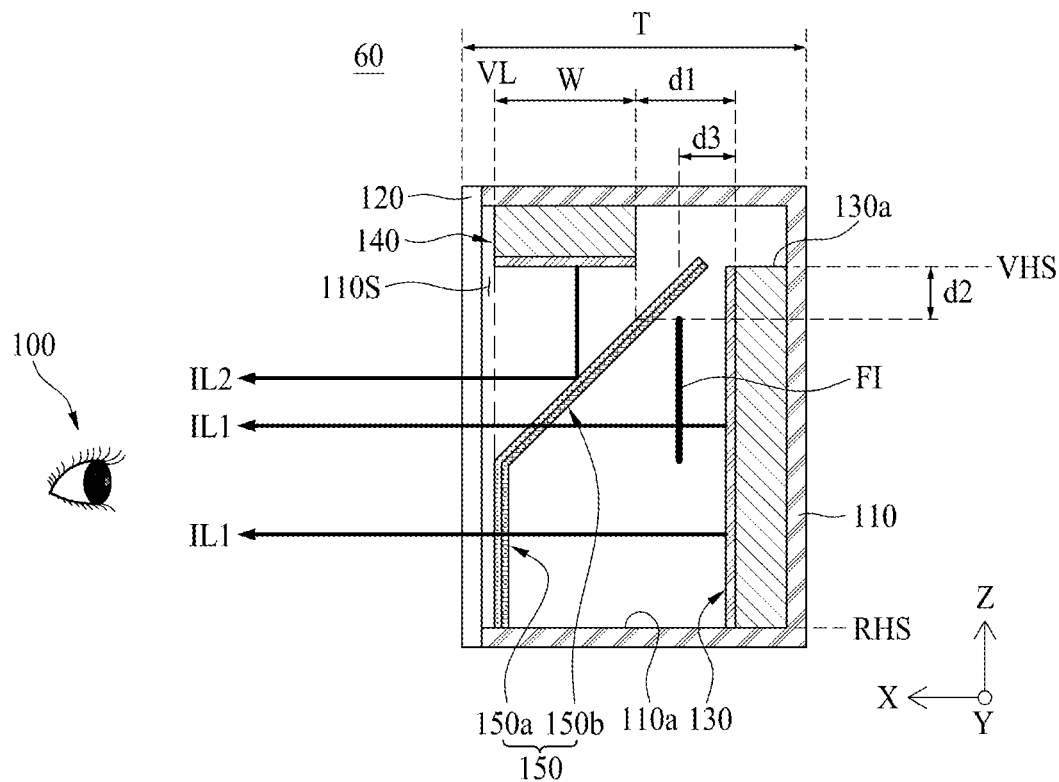
FIG. 12 is a diagram illustrating a stereoscopic display device according to another embodiment of the present disclosure.
Figure 13:
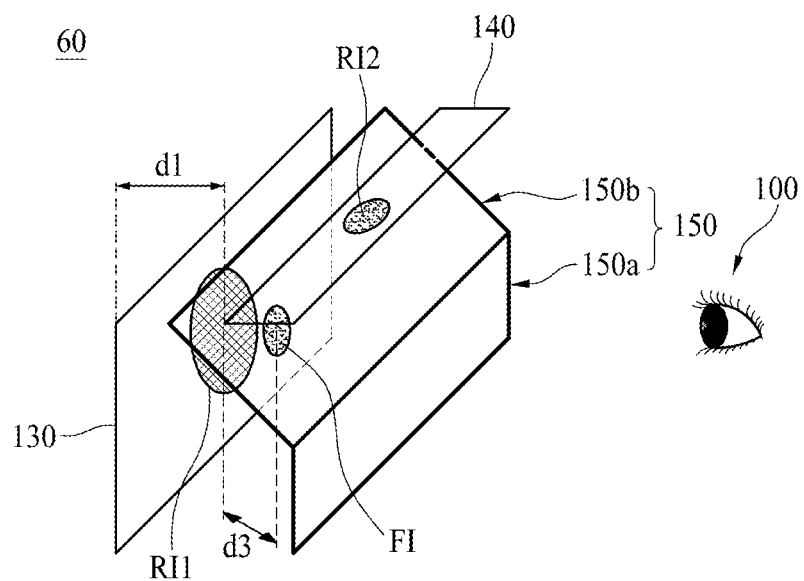
FIG. 13 is a diagram illustrating a stereoscopic image realized in the stereoscopic display device illustrated in FIG. 12.

FIG. 12 is a diagram illustrating a stereoscopic display device 60 according to another embodiment of the present disclosure, and FIG. 13 is a diagram illustrating a stereoscopic image realized in the stereoscopic display device illustrated in FIG. 12. FIGS. 12 and 13 illustrate an example where a structure of the semi-transmissive optical member 150 in the stereoscopic display device 40 illustrated in FIGS. 8 and 9 has been modified. Hereinafter, only a semi-transmissive optical member 150 and elements relevant thereto will be described, and repetitive descriptions of the other elements are not repeated.

Referring to FIGS. 12 and 13, in the stereoscopic display device 60 according to another embodiment of the present disclosure, a semi-transmissive optical member 150 may include a vertical portion 150a and an inclined portion 150b and may be disposed between a lower plate of a housing 110 and a top 130a of a first display 130. The semi-transmissive optical member 150 may allow a second image RI2 displayed on the second display 140 to be displayed in front of a first image RI displayed on the first display 130. That is, the semi-transmissive optical member 150 may allow a foreground image corresponding to the second image RI2 to be displayed in front of the first display 130.

The semi-transmissive optical member 150 according to an embodiment may include the vertical portion 150a parallel to the first display 130 and the inclined portion 150b which faces the second display 140 and is inclined from the vertical portion 150a. The semi-transmissive optical member 150 according to the present embodiment, as described above, may include a transparent supporting plate and a reflective polarization film, and each of the transparent supporting plate and the reflective polarization film may include a vertical portion 150a and an inclined portion 150b. Therefore, in the present embodiment, only the vertical portion 150a and the inclined portion 150b of the semi-transmissive optical member 150 will be described below, and repetitive descriptions of the transparent supporting plate and the reflective polarization film are not repeated.

The vertical portion 150a may be vertically disposed on the lower plate of the housing 110 in parallel with a display surface of the first display 130 and may be disposed close to the cover window 120, with respect to a vertical axis direction Z. In this case, the vertical portion 150a may be disposed on the same vertical line VL as one end of the second display 140 adjacent to the cover window 120. Also, the vertical portion 150a may face a lower area of the first display 130 adjacent to a reference horizontal surface RHS. The vertical portion 150a may transmit a light IL1 for a first image RI1, displayed on the first display 130, toward the cover window 120. Particularly, the vertical portion 150a may be vertically disposed under the second display 140 and may face the display surface of the first display 130, and thus, may transmit only the light IL1 for the first image RI1 displayed on the first display 130 without transmitting or reflecting a light IL2 for a second image RI2 displayed on the second display 140.

The inclined portion 150b may be inclined in a direction from an upper side of the vertical portion 150a to the top 130a of the first display 130. That is, the inclined portion 150b may be slopingly displayed in front of the first display 130 and under the second display 140. In this case, the inclined portion 150b may be inclined at an angle of 45 degrees from the upper side of the vertical portion 150a. The inclined portion 150b may transmit the light IL1 for the first image RI1, displayed on the first display 130, toward the cover window 120. On the other hand, the light IL2 for the second image RI2 displayed on the second display 140 may be reflected toward the cover window 120.

The light IL1 for the first image RI1 displayed on the first display 130 may pass through the vertical portion 150a and the inclined portion 150b, and in this case, a line-based image quality defect occurs due to a boundary between the vertical portion 150a and the inclined portion 150b. In order to prevent the line-based image quality defect, the boundary between the vertical portion 150a and the inclined portion 150b may overlap a light blocking part (or a non-display area) between pixels provided in the first display 130.

In the present embodiment, the second display 140 may have a size which is less than that of the first display 130, and may be spaced apart from the display surface of the first display 130 by a first distance d1 in parallel with the reference horizontal surface RHS. That is, the second display 140 may have a size which is less than that of the first display 130, and may be disposed close to the cover window 120. In this case, a display surface of the second display 140 may be disposed on a virtual horizontal surface VHS, which extends from the top 130a of the first display 130, in parallel with the reference horizontal surface RHS. That is, the display surface of the second display 140 may be disposed on the same horizontal line as the top 130a of the first display 130 without being spaced apart from the top 130a of the first display 130, with respect to the vertical axis direction Z. Therefore, the other end of the second display 140 adjacent to the display surface of the first display 130 may be spaced apart from the semi-transmissive optical member 150 by a second distance d2.

In the stereoscopic display device 60 according to the present embodiment, the second display 140 may be spaced apart from the first display 130 by the first distance d1 in a direction toward the cover window 120, and thus, the second image RI2 displayed on the second display 140 may be reflected by the semi-transmissive optical member 150 and may be realized as a floating image FI in front of the first display 130. The floating image FI may be displayed to protrude from the display surface of the first display 130 to the cover window 120 by a third distance d3 (d3=d1−d2) which is a difference "d1−d2" between the first distance d1 and the second distance d2. In this case, the second display 140 may be horizontally disposed with respect to the semi-transmissive optical member 150, and thus, when seen from the side, the floating image FI may be realized as an erect virtual image between the cover window 120 and the first display 130. Therefore, a watcher 100 may look at the first image RI1 and the floating image FI, which is generated based on the second image RI2 and displayed in front of the first display 130, by using a first-image light passing through the semi-transmissive optical member 150 and a second-image light reflected by the semi-transmissive optical member 150 in front of the cover window 120, and thus, may recognize a stereoscopic image based on the first image RI1 and the floating image FI having different depths.

The second display 140 according to an embodiment may be spaced apart from the first display 130 in one of the vertical axis direction Z and the first horizontal axis direction X. For example, with respect to the first horizontal axis direction X, as the first distance d1 between the second display 140 and the first display 130 decreases, the floating image FI may be realized close to the display surface of the first display 130. For example, with respect to the vertical axis direction Z, as a height difference between the second display 140 and the top 130a of the first display 130 increases, the floating image FI may be realized behind the first display 130.

In the stereoscopic display device 60 according to the present embodiment, the second image RI2 having a relatively small size may be realized as the floating image FI in front of a specific area of the first display 130 through the semi-transmissive optical member 150 including the vertical portion 150a and the inclined portion 150b. Therefore, in the stereoscopic display device 60 according to the present embodiment, the vertical portion 150b of the semi-transmissive optical member 150 and a widthwise size W of the second display 140 corresponding thereto are reduced, and thus, a total widthwise size T is reduced. The stereoscopic display device 60 according to the present embodiment may be applied to dashboards of vehicles. For example, the first display 130 may display a dashboard image, and the second display 140 may display a speed indicator image. In this case, a driver may recognize the dashboard image, passing through the semi-transmissive optical member 150, as a background image and may recognize the speed indicator image as a foreground image, thereby recognizing a stereoscopic image by using the dashboard image and the speed indicator image having different depths.

Optionally, the stereoscopic display device 60 according to the present embodiment may further include the quarter-wave plate 160 attached on the cover window 120 as illustrated in FIG. 4, thereby providing the same effect as that of the stereoscopic display device 10 illustrated in FIG. 2 and providing the first and second images and a stereoscopic image based on a combination thereof to the watcher 100 wearing the polarization glasses.

Optionally, as illustrated in FIG. 5, the stereoscopic display device 60 according to the present embodiment may use the same polarization members 132 and 142 applied to the first and second displays 130 and 140, but may further include the half-wave plate 143 attached on the second display 140, thereby providing the same effect as that of the stereoscopic display device 10 illustrated in FIG. 2.

Optionally, the stereoscopic display device 60 according to the present embodiment may further include the second driver 230 illustrated in FIG. 11. In this case, the second display 140 may be fixed and spaced apart from the first display 130 by a certain distance along one of the first horizontal axis direction X and the vertical axis direction Z according to driving of the second driver 230, or a position thereof may be changed based on a preference of the watcher 100.

Figure 14:
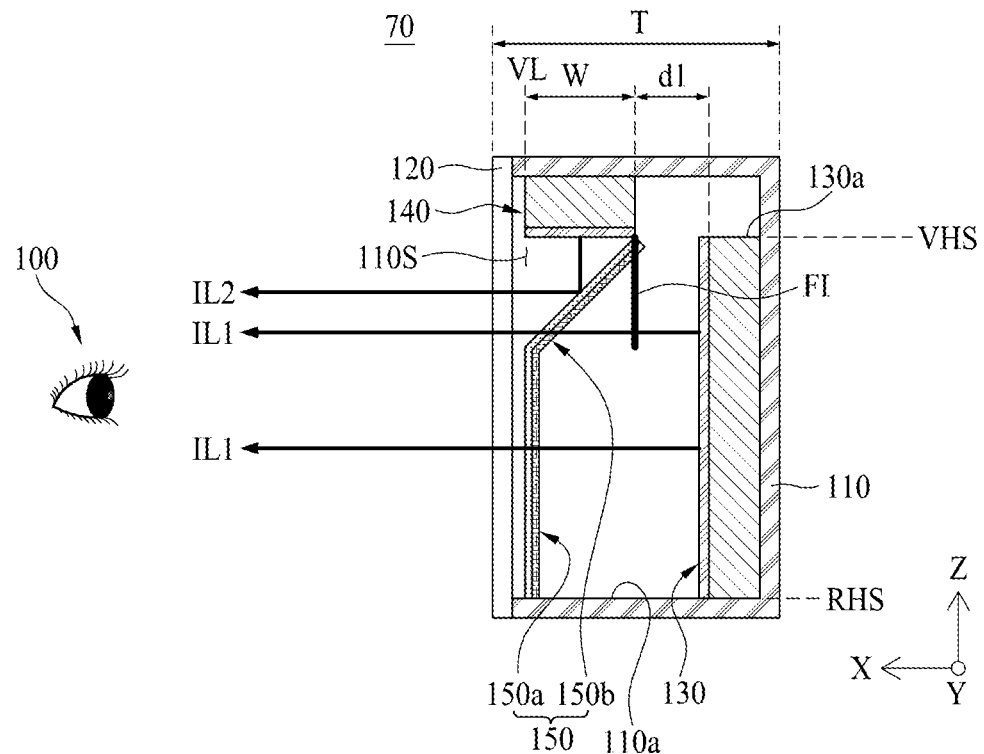
FIG. 14 is a diagram illustrating a stereoscopic display device according to another embodiment of the present disclosure.
Figure 15:
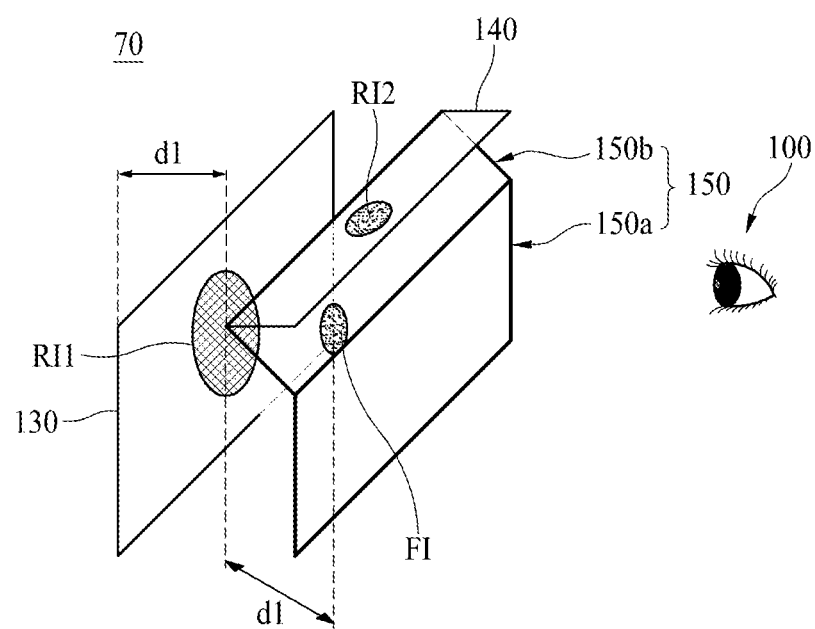
FIG. 15 is a diagram illustrating a stereoscopic image realized in the stereoscopic display device illustrated in FIG. 14.

FIG. 14 is a diagram illustrating a stereoscopic display device 70 according to another embodiment of the present disclosure, and FIG. 15 is a diagram illustrating a stereoscopic image realized in the stereoscopic display device illustrated in FIG. 14. FIGS. 14 and 15 illustrate an example where a structure of the semi-transmissive optical member 150 in the stereoscopic display device 60 illustrated in FIGS. 12 and 13 has been modified. Hereinafter, only a semi-transmissive optical member 150 and elements relevant thereto will be described, and repetitive descriptions of the other elements are not repeated.

Referring to FIGS. 14 and 15, in the stereoscopic display device 70 according to another embodiment of the present disclosure, the semi-transmissive optical member 150 may have a structure for realizing a second image RI2 having a relatively small size as a floating image RI in front of an upper area of a first display 130. The semi-transmissive optical member 150 according to the present embodiment may include a vertical portion 150a, which faces a half or more of a display surface of the first display 130 and long extends along a vertical axis direction Z in parallel with the display surface, and an inclined portion 150b which is inclined to face a portion other than the display surface of the first display 130. In comparison with the semi-transmissive optical member 150 illustrated in FIG. 12, a height of the vertical portion 150a of the semi-transmissive optical member 150 according to the present embodiment increases, and due to the increase in the height of the vertical portion 150a, a size of the inclined portion 150b decreases.

Based on the same stereoscopic image realizing method as that of the stereoscopic display device 60 of FIGS. 12 and 13, the stereoscopic display device 70 according to the present embodiment may realize a second image RI2 having a relatively small size as the floating image RI in front of the upper area of the first display 130.

Optionally, the stereoscopic display device 70 according to the present embodiment may further include the quarter-wave plate 160 attached on the cover window 120 as illustrated in FIG. 4, thereby providing the same effect as that of the stereoscopic display device 10 illustrated in FIG. 2 and providing the first and second images and a stereoscopic image based on a combination thereof to the watcher 100 wearing the polarization glasses.

Optionally, as illustrated in FIG. 5, the stereoscopic display device 70 according to the present embodiment may use the same polarization members 132 and 142 applied to the first and second displays 130 and 140, but may further include the half-wave plate 143 attached on the second display 140, thereby providing the same effect as that of the stereoscopic display device 10 illustrated in FIG. 2.

Optionally, the stereoscopic display device 70 according to the present embodiment may further include the second driver 230 illustrated in FIG. 11. In this case, the second display 140 may be fixed and spaced apart from the first display 130 by a certain distance along one of the first horizontal axis direction X and the vertical axis direction Z according to driving of the second driver 230, or a position thereof may be changed based on a preference of the watcher 100.

Figure 16:
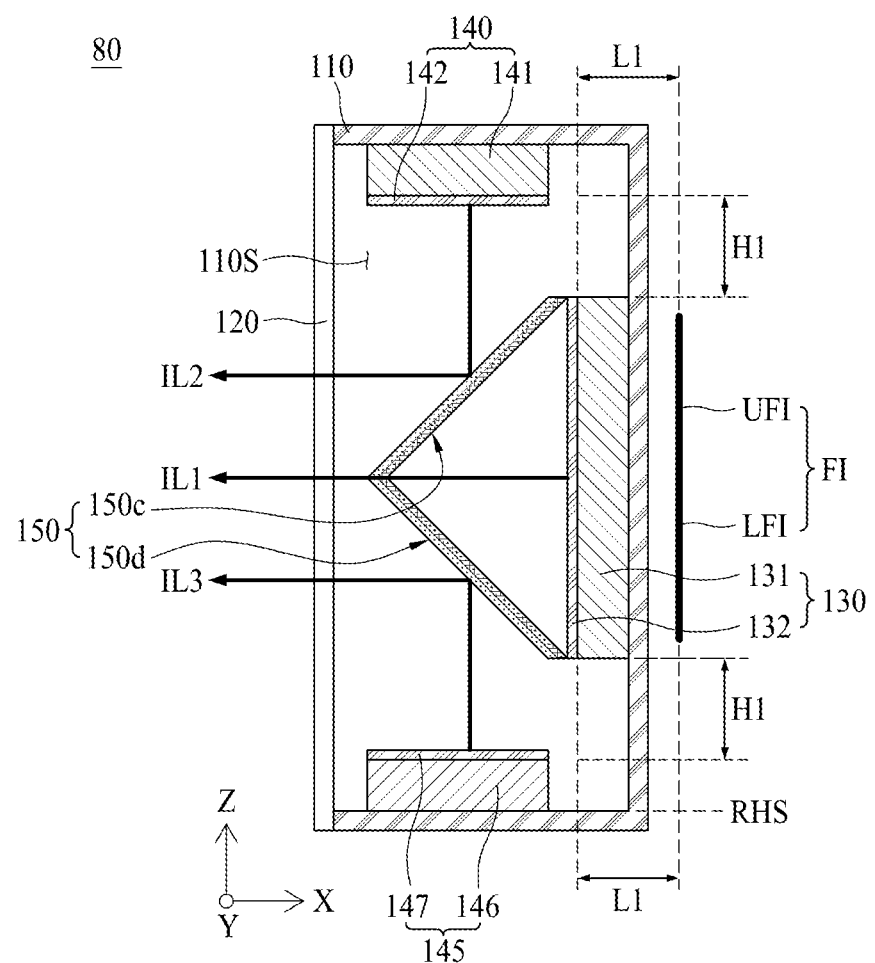
FIG. 16 is a diagram illustrating a stereoscopic display device according to another embodiment of the present disclosure.
Figure 17:
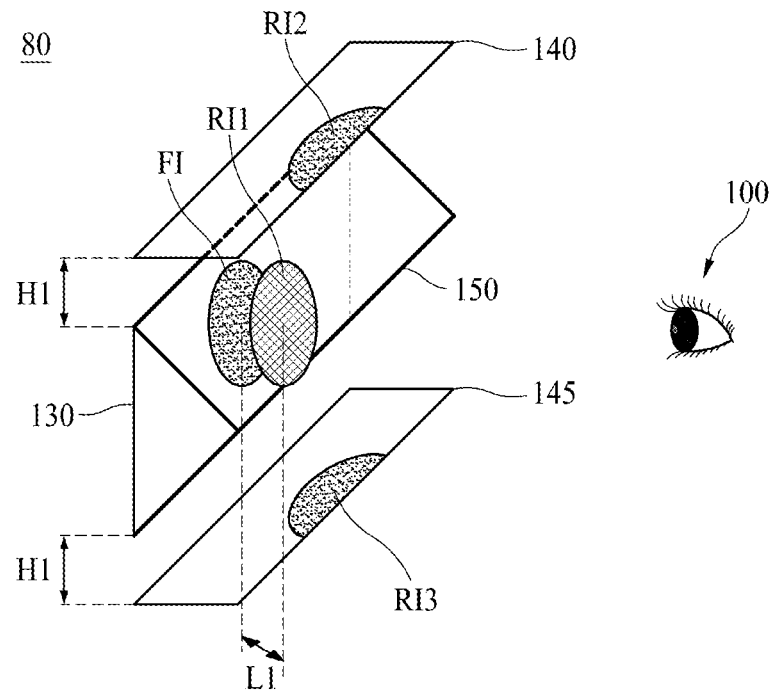
FIGS. 17 to 19 are diagrams illustrating examples of a stereoscopic image realized in the stereoscopic display device illustrated in FIG. 16.
Figure 18:
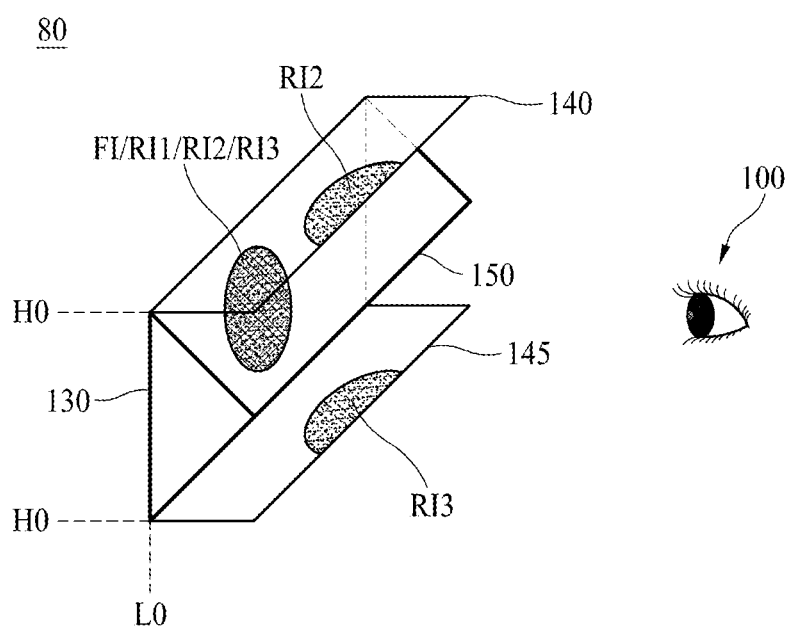
Figure 19:
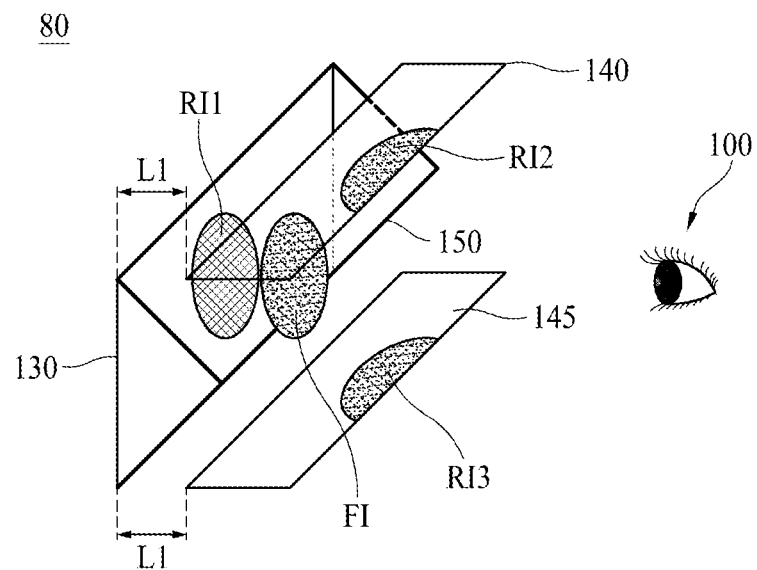

FIG. 16 is a diagram illustrating a stereoscopic display device 80 according to another embodiment of the present disclosure, and FIGS. 17 to 19 are diagrams illustrating examples of a stereoscopic image realized in the stereoscopic display device illustrated in FIG. 16. FIGS. 16 and 17 illustrate an example where a third display is added and a structure of the semi-transmissive optical member 150 has been modified in the stereoscopic display device 60 illustrated in FIGS. 12 and 13. Hereinafter, only a third display and a semi-transmissive optical member 150 and elements relevant thereto will be described, and repetitive descriptions of the other elements are not repeated.

Referring to FIG. 16, the stereoscopic display device 80 according to another embodiment of the present disclosure may include a housing 110, a cover window 120, a first display 130, a second display 140, a third display 145, and a semi-transmissive optical member 150.

The housing 110, the cover window 120, and the first display 130 are the same as those of the stereoscopic display device 10 illustrated in FIG. 2, and thus, their repetitive descriptions are not repeated.

The second display 140 may be installed on an upper plate of the housing 110 and may directly face the semi-transmissive optical member 150. That is, the second display 140 may be disposed on the semi-transmissive optical member 150 with respect to a vertical axis direction Z and may display a second image RI2 for realizing a floating image FI. Except that the second display 140 has a size which is less than that of the first display 130, the second display 140 may have the same configuration as that of the second display illustrated in FIG. 2, and thus, its repetitive description is not repeated.

The second display 140 according to an embodiment may be spaced apart from a top 130a of the first display 130 by a first height H1 with respect to the vertical axis direction Z.

The second image RI2 displayed on the second display 140 according to an embodiment may be a first area of the floating image FI, for example, an upper half image of the floating image FI with respect to the vertical axis direction Z.

The third display 145 may be installed in parallel with the second display 140 with the semi-transmissive optical member 150 therebetween and may be disposed under the semi-transmissive optical member 150 with respect to the vertical axis direction Z. That is, the third display 145 may be installed on a lower plate of the housing 110 to directly face the semi-transmissive optical member 150 and may display a third image RI3 for realizing the floating image FI. The third display 145 according to an embodiment may include a third display panel 146, which displays the third image RI3, and a third polarization member 147 which is disposed on a front surface of the third display panel 146 to polarize a third-image light IL3 to a second polarization state. Except that the third display 145 having such a configuration has a size which is less than that of the first display 130, the third display 145 may have the same configuration as that of the second display illustrated in FIG. 2, and thus, its repetitive description is not repeated.

The third display 145 according to an embodiment may be spaced apart from a bottom 130b of the first display 130 by the first height H1 with respect to the vertical axis direction Z.

The third image RI3 displayed on the third display 145 according to an embodiment may be a second area of the floating image FI, for example, a lower half image of the floating image FI with respect to the vertical axis direction Z.

The semi-transmissive optical member 150 may include a first inclined portion 150c and a second inclined portion 150d. For example, when seen in a second horizontal axis direction Y, the semi-transmissive optical member 150 may include a '<'-shaped cross-sectional surface.

The first inclined portion 150c may be slopingly disposed between the first display 130 and the cover window 120. The first inclined portion 150c according to an embodiment may have a half size of the first display 130 and may be inclined at an angle of 45 degrees from an upper side of the first display 130. That is, one end of the first inclined portion 150c may contact a top 130a of the first display 130, and the other end of the first inclined portion 150c may be disposed adjacent to the cover window 120. Therefore, an angle between the one end of the first inclined portion 150c and the first display 130 may be 45 degrees. The first inclined portion 150c may transmit a light IL1 for a first image RI1, displayed on the first display 130, toward the cover window 120 and may reflect a light IL2 for the second image RI2, displayed on the second display 140, toward the cover window 120.

The second inclined portion 150d may be slopingly disposed between the first display 130 and the cover window 120 and may be symmetric about the first inclined 140c with respect to a center of the first display 130. The second inclined portion 150d according to an embodiment may have a half size of the first display 130 and may be inclined at an angle of 45 degrees from a lower side of the first display 130 or at an angle of 90 degrees from the first inclined portion 150c. That is, one end of the second inclined portion 150d may contact a bottom 130b of the first display 130, and the other end of the second inclined portion 150d may be adjacent to the cover window 120 and may be provided as one body with the other end of the first inclined portion 150c. Therefore, an angle between the one end of the second inclined portion 150d and the first display 130 may be 45 degrees. The second inclined portion 150d may transmit the light IL1 for the first image RI1, displayed on the first display 130, toward the cover window 120 and may reflect the light IL3 for the third image RI3, displayed on the third display 145, toward the cover window 120.

The light IL1 for the first image RI1 displayed on the first display 130 may pass through the first inclined portion 150c and the second inclined portion 150d, and in this case, a line-based image quality defect occurs due to a vertical boundary between the first inclined portion 150c and the second inclined portion 150d. In order to prevent the line-based image quality defect, the boundary between the first inclined portion 150c and the second inclined portion 150d may overlap a light blocking part (or a non-display area) between pixels provided in the first display 130.

In the stereoscopic display device 80 according to the present embodiment, each of the second display 140 and the third display 145 may be spaced apart from the first display 130 by a first height H1 with respect to the vertical axis direction Z. Therefore, the second image RI2 displayed on the second display 140 may be reflected by the first inclined portion 150c of the semi-transmissive optical member 150, and simultaneously, the third image RI3 displayed on the third display 145 may be reflected by the second inclined portion 150d of the semi-transmissive optical member 150, whereby the second image RI2 and the third image RI3 may be combined with each other in a rear region spaced apart from the first display 130 by a distance L1 corresponding to the first height H1 to realize one floating image FI. That is, the floating image FI may be realized by combining an upper floating image UFI corresponding to the second image RI2 and a lower floating image LFI corresponding to the third image RI3 in a region which is behind the first display 130 and is spaced apart from the first display 130 by a distance corresponding to the first height H1. In this case, each of the second display 140 and the third display 145 may be horizontally disposed with respect to the semi-transmissive member 150, and thus, when seen from the side, the floating image FI may be realized as an erect virtual image behind the first display 130. Therefore, a watcher 100 may look at the first image RI1 and the floating image FI, which is generated based on the second image RI2 and the third image RI3 and displayed behind the first display 130, by using the light LI1 for the first image RI1 passing through the semi-transmissive optical member 150 and the respective lights IL2 and IL3 for the second and third images RL2 and RL3 reflected by the semi-transmissive optical member 150 in front of the cover window 120, and thus, may recognize a stereoscopic image based on the first image RI1 and the floating image FI having different depths.

In the stereoscopic display device 80 according to the present embodiment, by using the semi-transmissive optical member 150 including the first inclined portion 150c and the second inclined portion 150d, one floating image FI may be realized based on the second image RI2 and the third image RI3 respectively displayed by half each on the second display 140 and the third display 145. Therefore, in the stereoscopic display device 80 according to the present embodiment, a total widthwise size T decreases by a width of the first inclined portion 150c or the second inclined portion 150d of the semi-transmissive optical member 150.

In the stereoscopic display device 80 according to the present embodiment, each of the second display 140 and the third display 145 may be spaced apart from the first display 130 in one of the vertical axis direction Z and a first horizontal axis direction X.

For example, as illustrated in FIG. 18, the second and third displays 140 and 145 may be respectively disposed in contact with the top 130a and the bottom 130b of the first display 130 without being spaced apart from the top 130a and the bottom 130b of the first display 130, with respect to the vertical axis direction Z. In this case, there is no height difference H0 between each of the second and third displays 140 and 145 and the first display 130. Therefore, the floating image FI based on the second and third images RI2 and RI3 respectively displayed on the second and third displays 140 and 145 may not have a distance difference L0 with the first image RI1 displayed on the first display 130 and may overlap the first image RI1, and thus, the first image RI1 and the floating image FI may be displayed as a two-dimensionally (2D) image having no height difference.

For example, as illustrated in FIG. 19, each of the second and third displays 140 and 145 may be disposed in front of the first display 130 and may be spaced apart from the first display 130 by a first distance L1, with respect to a horizontal axis direction X. In this case, there is a distance difference L1 equal to a separation distance between each of the second and third displays 140 and 145 and the first display 130. Therefore, the second image RI2 displayed on the second display 140 may be reflected by the first inclined portion 150c of the semi-transmissive optical member 150, and simultaneously, the third image RI3 displayed on the third display 145 may be reflected by the second inclined portion 150d of the semi-transmissive optical member 150, whereby the second image RI2 and the third image RI3 may be combined with each other in a front region which is in front of the first display 130 and is spaced apart from the first display 130 by a distance L1 corresponding to the first height H1 to realize one floating image FI. Therefore, a watcher 100 may look at the floating image FI displayed in front of the first display 130, and thus, may recognize a stereoscopic image based on the first image RI1 and the floating image FI having different depths.

Optionally, the stereoscopic display device 80 according to the present embodiment may further include the quarter-wave plate 160 attached on the cover window 120 as illustrated in FIG. 4, thereby providing the same effect as that of the stereoscopic display device 10 illustrated in FIG. 2 and providing the first and second images and a stereoscopic image based on a combination thereof to the watcher 100 wearing the polarization glasses.

Optionally, as illustrated in FIG. 5, the stereoscopic display device 80 according to the present embodiment may use the same polarization members 132, 142, and 147 applied to the first and second displays 130, 140, and 145, but may further include the half-wave plate 143 attached on each of the second display 140 and the third display 145, thereby providing the same effect as that of the stereoscopic display device 10 illustrated in FIG. 2.

Optionally, the stereoscopic display device 80 according to the present embodiment may further include the second driver 230 illustrated in FIG. 11. In this case, each of the second display 140 and the third display 145 may be fixed and spaced apart from the first display 130 by a certain distance along one of the first horizontal axis direction X and the vertical axis direction Z according to driving of the second driver 230, or a position thereof may be changed based on a preference of the watcher 100.

Figure 20:
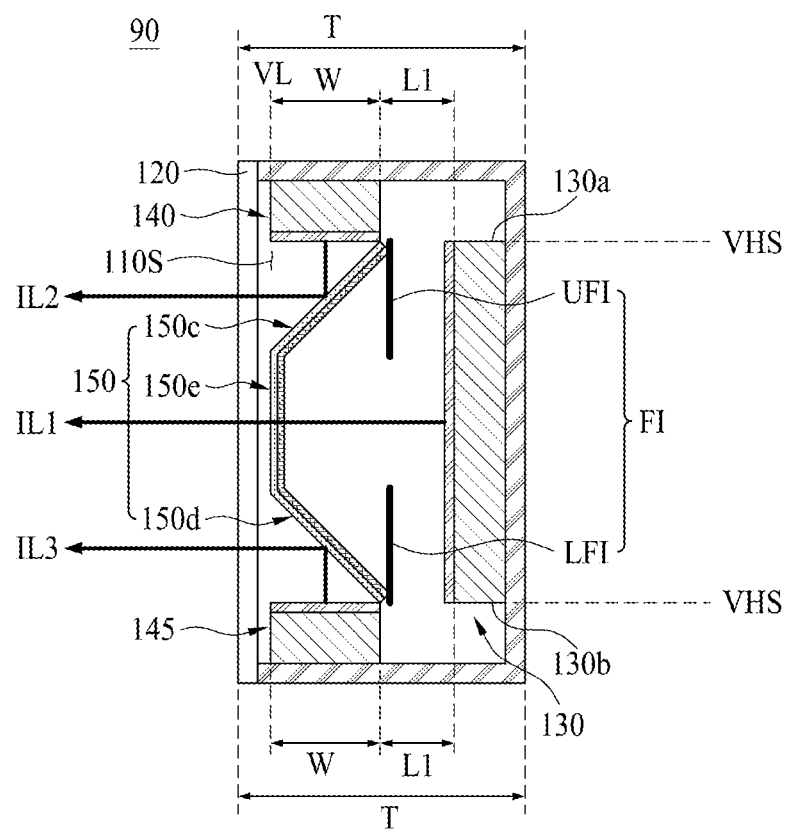
FIG. 20 is a diagram illustrating a stereoscopic display device according to another embodiment of the present disclosure.
Figure 21:
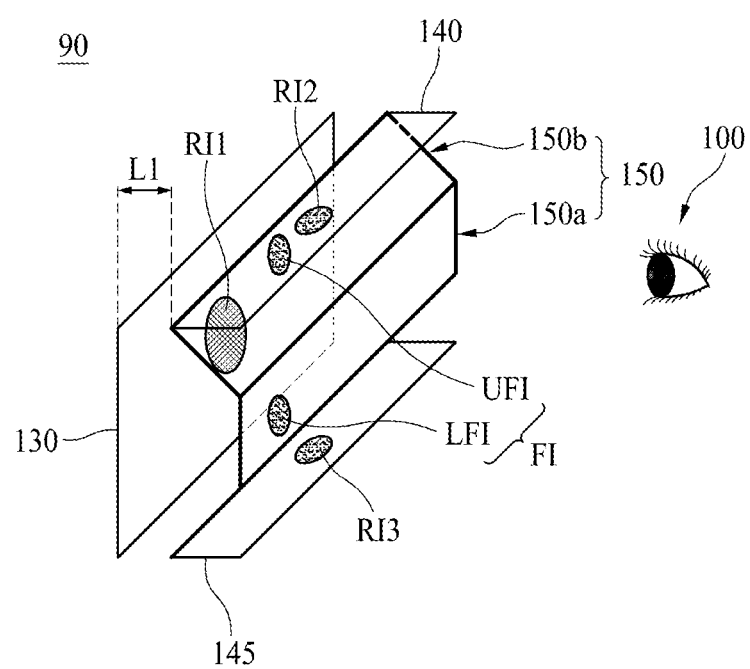
FIG. 21 is a diagram illustrating a stereoscopic image realized in the stereoscopic display device illustrated in FIG. 20.

FIG. 20 is a diagram illustrating a stereoscopic display device 90 according to another embodiment of the present disclosure, and FIG. 21 is a diagram illustrating a stereoscopic image realized in the stereoscopic display device illustrated in FIG. 20. FIGS. 16 and 17 illustrate an example where a structure of the semi-transmissive optical member 150 in the stereoscopic display device 80 illustrated in FIG. 16 has been modified. Hereinafter, only a semi-transmissive optical member 150 and elements relevant thereto will be described, and repetitive descriptions of the other elements are not repeated.

Referring to FIGS. 20 and 21, in the stereoscopic display device 90 according to another embodiment of the present disclosure, the semi-transmissive optical member 150 may include a first inclined portion 150c, a second inclined portion 150d, and a vertical portion 150e. For example, when seen in a second horizontal axis direction Y, the semi-transmissive optical member 150 may include a '⊏'-shaped cross-sectional surface.

The first inclined portion 150c may be slopingly disposed between a first display 130 and a cover window 120. The first inclined portion 150c according to an embodiment may have a ⅓ or less size of the first display 130 and may be inclined at an angle of 45 degrees from an upper side of the first display 130. That is, one end of the first inclined portion 150c may contact a top 130a of the first display 130, and the other end of the first inclined portion 150c may be disposed adjacent to the cover window 120. Therefore, an angle between the one end of the first inclined portion 150c and the first display 130 may be 45 degrees. The first inclined portion 150c may transmit a light IL1 for a first image RI1, displayed on an upper display area of the first display 130 with a vertical axis direction X, toward the cover window 120 and may reflect a light IL2 for a second image RI2, displayed on a second display 140, toward the cover window 120.

The second inclined portion 150d may be slopingly disposed between the first display 130 and the cover window 120 and may be symmetric about the first inclined 140c with respect to a center of the first display 130. The second inclined portion 150d according to an embodiment may have a ⅓ or less size of the first display 130 and may be inclined at an angle of 45 degrees from a lower side of the first display 130 or at an angle of 90 degrees from the first inclined portion 150c. That is, one end of the second inclined portion 150d may contact a bottom 130b of the first display 130, and the other end of the second inclined portion 150d may be adjacent to the cover window 120. Therefore, an angle between the one end of the second inclined portion 150d and the first display 130 may be 45 degrees. The second inclined portion 150d may transmit the light IL1 for the first image RI1, displayed on a lower display area of the first display 130, toward the cover window 120 and may reflect a light IL3 for a third image RI3, displayed on a third display 145, toward the cover window 120.

The vertical portion 150e may be provided between the first inclined portion 150c and the second inclined portion 150d and may be disposed in parallel with the first display 130. That is, the vertical portion 150e may be vertically disposed on a lower plate of a housing 110. In this case, an upper side of the vertical portion 150e may be provided as one body with the other end of the first inclined portion 150c, and a lower side of the vertical portion 150e may be provided as one body with the other end of the second inclined portion 150d. Therefore, the first inclined portion 150c may be inclined at an angle of 135 degrees from the upper side of the vertical portion 150e, and the second inclined portion 150d may be inclined at an angle of 135 degrees from the lower side of the vertical portion 150e. Here, an inclined angle of each of the first and second inclined portions 150c and 150d inclined from the vertical portion 150e may vary based on a size of each of the second and third displays 140 and 145. The vertical portion 150e may transmit the light IL1 for the first image RI1, displayed on a center display area of the first display 130, toward the cover window 120. Particularly, the vertical portion 150e may be vertically disposed between the second display 140 and the third display 145 and may face a display surface of the first display 130, and thus, may transmit only the light IL1 for the first image RI1 displayed on the first display 130 without transmitting or reflecting the lights IL2 and IL3 for the second and third images RI2 and RI3 respectively displayed on the second and third displays 140 and 145.

The light IL1 for the first image RI1 displayed on the first display 130 may pass through the vertical portion 150e, the first inclined portion 150c, and the second inclined portion 150d, and in this case, a line-based image quality defect occurs due to a boundary between the vertical portion 150e and the first inclined portion 150c and a boundary between the vertical portion 150e and the second inclined portion 150d. In order to prevent the line-based image quality defect, the boundary between the vertical portion 150e and the first inclined portion 150c and the boundary between the vertical portion 150e and the second inclined portion 150d may overlap a light blocking part (or a non-display area) between pixels provided in the first display 130.

In the stereoscopic display device 90 according to the present embodiment, each of the second display 140 and the third display 145 may be spaced apart from the first display 130 by a first distance L1 with respect to the vertical axis direction Z. Therefore, the second image RI2 displayed on the second display 140 may be reflected by the first inclined portion 150c of the semi-transmissive optical member 150, and simultaneously, the third image RI3 displayed on the third display 145 may be reflected by the second inclined portion 150d of the semi-transmissive optical member 150, whereby the second image RI2 and the third image RI3 may be combined with each other to realize a floating image FI in a rear region which is in front of each of an upper display area and a lower display area of the first display 130 and is spaced apart from the first display 130 by a distance L1 corresponding to the first distance L1. That is, the floating image FI may include an upper floating image UFI, corresponding to the second image RI2 realized in a front region which is in front of the upper display area of the first display 130 and is spaced apart from the upper display area of the first display 130 by a distance corresponding to the first distance L1, and a lower floating image LFI corresponding to a third image RI3 realized in a front region which is in front of the lower display area of the first display 130 and is spaced apart from the lower display area of the first display 130 by a distance corresponding to the first distance L1. In this case, each of the second display 140 and the third display 145 may be horizontally disposed with respect to the semi-transmissive member 150, and thus, when seen from the side, the floating image FI may be realized as an erect virtual image in front of the first display 130. Therefore, a watcher 100 may look at the first image RI1, the upper floating image UFI and the lower floating image LFI, which are generated based on the second image RI2 and the third image RI3 and are respectively displayed in front of the upper display area and the lower display area of the first display 130, by using the light LI1 for the first image RI1 passing through the semi-transmissive optical member 150 and the respective lights IL2 and IL3 for the second and third images RL2 and RL3 reflected by the semi-transmissive optical member 150 in front of the cover window 120, and thus, may recognize a stereoscopic image based on the first image RI1, the upper floating image UFI, and the lower floating image LFI having different depths.

The stereoscopic display device 90 according to the present embodiment has the same effect as that of the stereoscopic display device of FIG. 16, and by using the semi-transmissive optical member 150 including the first inclined portion 150c and the second inclined portion 150d, the upper floating image UFI and the lower floating image LFI which differ may be respectively realized in front of the upper display area and the lower display area of the first display 130.

In the stereoscopic display device 90 according to the present embodiment, the first inclined portion 150c, the second inclined portion 150d, and the vertical portion 150e may have the same size or different sizes, based on a size of each of the second and third displays 140 and 145. In this case, in the present embodiment, the upper floating image UFI and the lower floating image LFI may be realized to have the same size or different sizes, Optionally, in the stereoscopic display device 90 according to the present embodiment, each of the second display 140 and the third display 145 may be spaced apart from the first display 130 in one of the vertical axis direction Z and a first horizontal axis direction X, and thus, the first image RI1, the second image RI2, and the third image RI3 may be displayed as a 2D image or may be realized as the upper floating image UFI and the lower floating image LFI, which differ, behind the first display 130.

Optionally, the stereoscopic display device 90 according to the present embodiment may further include the quarter-wave plate 160 attached on the cover window 120 as illustrated in FIG. 4, thereby providing the same effect as that of the stereoscopic display device 10 illustrated in FIG. 2 and providing the first and second images and a stereoscopic image based on a combination thereof to the watcher 100 wearing the polarization glasses.

Optionally, as illustrated in FIG. 5, the stereoscopic display device 90 according to the present embodiment may use the same polarization members 132, 142, and 147 applied to the first and second displays 130, 140, and 145, but may further include the half-wave plate 143 attached on each of the second display 140 and the third display 145, thereby providing the same effect as that of the stereoscopic display device 10 illustrated in FIG. 2.

Optionally, the stereoscopic display device 90 according to the present embodiment may further include the second driver 230 illustrated in FIG. 11. In this case, each of the second display 140 and the third display 145 may be fixed and spaced apart from the first display 130 by a certain distance along one of the first horizontal axis direction X and the vertical axis direction Z according to driving of the second driver 230, or a position thereof may be changed based on a preference of the watcher 100.

As described above, according to the embodiments of the present disclosure, a realistic stereoscopic image having a high resolution and high luminance is realized, and the stereoscopic display device is slimmed.

Moreover, according to the embodiments of the present disclosure, a floating image may be displayed on a front or rear specific area of a display.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A stereoscopic display device comprising:
a first display displaying a first image;
a second display displaying a second image, the second display spaced apart from the first display;
a semi-transmissive optical member transmitting the first image and reflecting the second image,
the semi-transmissive optical member having a polarization transmissive axis transmitting the first image and a polarization reflective axis reflecting the second image;
a hinge shaft coupled to a first end of the semi-transmissive optical member; and
a first driver coupled to the first end of the semi-transmissive optical member;
wherein the first driver is configured to change a spacing distance between the first end of the semi-transmissive optical member and the first display.

2. The stereoscopic display device of claim 1, wherein a floating image corresponding to the second image reflected by the semi-transmissive optical member is displayed in front of or behind the first display.

3. The stereoscopic display device of claim 1, wherein a sum of a transmittance and a reflectivity of the semi-transmissive optical member is more than 100%.

4. The stereoscopic display device of claim 1, further comprising:
a housing including an accommodation space, accommodating the first and second displays and the semi-transmissive optical member, and one opening externally opening one side of the accommodation space; and a cover window covering the one opening, wherein the semi-transmissive optical member is slopingly disposed between the cover window and the first display.

5. The stereoscopic display device of claim 4, wherein the semi-transmissive optical member is inclined at an angle of 45 degrees from a lower plate of the housing which supports the first display, and the second display is spaced apart from the first display along a vertical axis direction.

6. The stereoscopic display device of claim 4, wherein the semi-transmissive optical member is inclined at an angle of one of 45 degrees to 65 degrees from a lower plate of the housing which supports the first display, and the second display is disposed on the semi-transmissive optical member in parallel with the lower plate, or is inclined from a virtual horizontal surface extending from a top of the first display.

7. The stereoscopic display device of claim 6, wherein the second display has a size which is less than a size of the first display, and is spaced apart from the first display along a vertical axis direction.

8. The stereoscopic display device of claim 4, wherein the semi-transmissive optical member has a curved shape protruding toward the first display.

9. The stereoscopic display device of claim 8, wherein the second display has a size which is less than a size of the first display.

10. The stereoscopic display device of claim 9, wherein the second display is spaced apart from the first display along at least one of a horizontal axis direction parallel to the lower plate and a vertical axis direction vertical to the horizontal axis direction.

11. The stereoscopic display device of claim 4, further comprising: a quarter-wave plate attached on the cover window.

12. The stereoscopic display device of claim 1, wherein the first driver is configured to adjust an angle of the semi-transmissive optical member.

13. The stereoscopic display device of claim 1, further comprising a second driver, wherein the second driver is configured to adjust an angle of the second display.

14. The stereoscopic display device of claim 1, wherein the first display includes a first polarization member polarizing the first image to a first polarization state, and the second display includes a second polarization member polarizing the second image to a second polarization state different from the first polarization state.

15. The stereoscopic display device of claim 1, wherein the first display includes a first polarization member polarizing the first image to a first polarization state, and the second display includes a second polarization member, polarizing the second image to the first polarization state, and a half-wave plate changing the second image, polarized to the first polarization state, to a second polarization state different from the first polarization state.

16. The stereoscopic display device of claim 1, further comprising: a second driver moving the second display along at least one of a horizontal axis direction and a vertical axis direction.

17. The stereoscopic display device of claim 1, wherein a second end of the semi-transmissive optical member is in contact with the first display or the second display.

18. A stereoscopic display device comprising:

a first display displaying a first image;

a second display displaying a second image;

a semi-transmissive optical member transmitting the first image and reflecting the second image, the semi-transmissive optical member having a polarization transmissive axis transmitting the first image and a polarization reflective axis reflecting the second image, the semi-transmissive optical member including:

a vertical portion parallel to the first display; and a first inclined portion inclined at an angle greater than 90 degrees from the vertical portion to face the second display.

19. The stereoscopic display device of claim 18, wherein the vertical portion and the first inclined portion of the semi-transmissive optical member have different sizes.

20. The stereoscopic display device of claim 18, wherein the second display has a size which is less than a size of the first display, and is spaced apart from the first display along one of a horizontal axis direction and a vertical axis direction.

21. The stereoscopic display device of claim 18, further comprising: a third display disposed in parallel with the second display with the semi-transmissive optical member therebetween, the third display displaying a third image, the semi-transmissive optical member including:

a second inclined portion transmitting the first image and reflecting the third image.

22. The stereoscopic display device of claim 21, wherein the first inclined portion, the second inclined portion, and the vertical portion of the semi-transmissive optical member have the same size or different sizes.

23. The stereoscopic display device of claim 21, wherein the second display and the third display have the same size which is less than a size of the first display, and are spaced apart from the first display along one of a vertical axis direction and a horizontal axis direction.

24. A stereoscopic display device comprising:

a first display displaying a first image;

a second display displaying a second image;

a third display disposed in parallel with the second display, the third display displaying a third image; and a semi-transmissive optical member including:

a first inclined portion transmitting the first image and reflecting the second image; and a second inclined portion transmitting the first image and reflecting the third image, wherein the second display, the third display, the first inclined portion, and the second inclined portion overlap with each other in a first direction.

25. The stereoscopic display device of claim 24, wherein the first inclined portion of the semi-transmissive optical member is inclined at an angle of 45 degrees from an upper side of the first display, and the second inclined portion of the semi-transmissive optical member is inclined at an angle of 45 degrees from a lower side of the first display.

26. The stereoscopic display device of claim 25, wherein the second display and the third display have the same size which is less than a size of the first display, and are spaced apart from the first display along one of a vertical axis direction and a horizontal axis direction.

27. The stereoscopic display device of claim 24, wherein
the first display includes a first polarization member polarizing the first image to a first polarization state,
the second display includes a second polarization member polarizing the second image to a second polarization state different from the first polarization state, and
the third display includes a third polarization member polarizing the third image to the second polarization state.

28. The stereoscopic display device of claim 27, further comprising: a housing including an accommodation space, accommodating the first, second, third displays and the semi-transmissive optical member, and one opening externally opening one side of the accommodation space;
a cover window covering the one opening; and
a quarter-wave plate attached on the cover window.

29. The stereoscopic display device of claim 24, wherein
the first display includes a first polarization member polarizing the first image to a first polarization state, and
the second display includes a second polarization member, polarizing the second image to the first polarization state, and a half-wave plate changing the second image, polarized to the first polarization state, to a second polarization state different from the first polarization state.

30. The stereoscopic display device of claim 24, further comprising: a second driver moving the second display and the third display along at least one of a horizontal axis direction and a vertical axis direction.

* * * * *